(12) United States Patent
Kang et al.

(10) Patent No.: US 12,549,712 B2
(45) Date of Patent: Feb. 10, 2026

(54) METHOD AND DEVICE FOR ENCODING/DECODING IMAGE BY USING GEOMETRICALLY CHANGED IMAGE

(71) Applicants: Electronics and Telecommunications Research Institute, Daejeon (KR); University-Industry Cooperation Group of Kyung Hee University, Yongin-si (KR)

(72) Inventors: Jung Won Kang, Daejeon (KR); Hyun Suk Ko, Daejeon (KR); Sung Chang Lim, Daejeon (KR); Jin Ho Lee, Daejeon (KR); Dong San Jun, Daejeon (KR); Hui Yong Kim, Daejeon (KR); Gwang Hoon Park, Seongnam-si (KR); Jin Soo Choi, Daejeon (KR); Tae Hyun Kim, Hwaseong-si (KR); Dae Young Lee, Ansan-si (KR); Young Su Heo, Suwon-si (KR)

(73) Assignees: Electronics and Telecommunications Research Institute, Daejeon (KR); University-Industry Cooperation Group of Kyung Hee University, Yongin-si (KR)

( * ) Notice: Subject to any disclaimer, the term of this patent is extended or adjusted under 35 U.S.C. 154(b) by 0 days.

(21) Appl. No.: 18/828,322

(22) Filed: Sep. 9, 2024

(65) Prior Publication Data
US 2025/0008090 A1    Jan. 2, 2025

Related U.S. Application Data

(63) Continuation of application No. 17/972,894, filed on Oct. 25, 2022, now Pat. No. 12,160,565, which is a
(Continued)

(30) Foreign Application Priority Data

Nov. 20, 2015 (KR) .......................... 10-2015-0163494

(51) Int. Cl.
*H04N 19/105* (2014.01)
*H04N 19/147* (2014.01)
(Continued)

(52) U.S. Cl.
CPC ......... *H04N 19/105* (2014.11); *H04N 19/147* (2014.11); *H04N 19/159* (2014.11); *H04N 19/176* (2014.11)

(58) Field of Classification Search
None
See application file for complete search history.

(56) References Cited

U.S. PATENT DOCUMENTS 6,792,128 B1 * 9/2004 Nguyen ............... H04N 1/3232
382/289
2008/0279478 A1 11/2008 Tsoupko-Sitnikov et al.
(Continued)

FOREIGN PATENT DOCUMENTS

CN     103190151 A     7/2013
CN     103299642 A     9/2013
(Continued)

OTHER PUBLICATIONS

Huwei Technologies Co., Ltd., "Affine transform prediction for next generation video coding," *Proceedings of the international Telecommunication Union—Telecommunication Standardization Sector Study Period*, COM 16—C1016 R1-E, Sep. 2015, pp. 1-11.
(Continued)

*Primary Examiner* — Talha M Nawaz
(74) *Attorney, Agent, or Firm* — NSIP Law

(57) ABSTRACT

A method and apparatus use a geometric modified image for video encoding/decoding. The encoding method may include: generating a geometric modified reference picture by geometrically modifying a reference picture; generating a prediction block of a current block within an encoding
(Continued)

target picture by performing inter prediction by referencing the reference picture or the geometrically modified reference picture; and encoding inter-prediction information of the current block.

13 Claims, 27 Drawing Sheets

Related U.S. Application Data continuation of application No. 17/160,845, filed on Jan. 28, 2021, now Pat. No. 11,516,463, which is a continuation of application No. 15/777,562, filed on May 18, 2018, now Pat. No. 10,944,962, which is a continuation of application No. PCT/KR2016/013366, filed on Nov. 18, 2016.

(51) Int. Cl.
  *H04N 19/159* (2014.01)
  *H04N 19/176* (2014.01)

(56) References Cited

U.S. PATENT DOCUMENTS

| | | | | |
|---|---|---|---|---|
| 2012/0147961 | A1* | 6/2012 | Guo | H04N 19/17 |
| | | | | 375/240.16 |
| 2013/0202046 | A1* | 8/2013 | Jeon | H04N 19/44 |
| | | | | 375/240.16 |
| 2013/0230103 | A1 | 9/2013 | Lim et al. | |
| 2013/0251044 | A1* | 9/2013 | Lim | H04N 19/50 |
| | | | | 375/240.12 |
| 2013/0279577 | A1 | 10/2013 | Schwarz et al. | |
| 2013/0301724 | A1 | 11/2013 | Boon et al. | |
| 2014/0146892 | A1* | 5/2014 | Sugio | H04N 19/513 |
| | | | | 375/240.16 |
| 2014/0192876 | A1* | 7/2014 | Yie | H04N 19/176 |
| | | | | 375/240.12 |
| 2014/0301456 | A1 | 10/2014 | Wang et al. | |
| 2015/0092851 | A1 | 4/2015 | Yoshikawa et al. | |
| 2015/0245062 | A1 | 8/2015 | Shimizu et al. | |
| 2015/0271516 | A1 | 9/2015 | Arimura et al. | |
| 2016/0029029 | A1* | 1/2016 | Lee | H04N 19/70 |
| | | | | 382/233 |
| 2016/0100163 | A1* | 4/2016 | Rapaka | H04N 19/182 |
| | | | | 375/240.16 |
| 2018/0288436 | A1 | 10/2018 | Abbas et al. | |
| 2018/0332279 | A1 | 11/2018 | Kang et al. | |
| 2021/0152815 | A1* | 5/2021 | Kang | H04N 19/147 |

FOREIGN PATENT DOCUMENTS

| | | |
|---|---|---|
| CN | 103891283 A | 6/2014 |
| CN | 103975598 A | 8/2014 |
| CN | 104718756 A | 6/2015 |
| CN | 104811736 A | 7/2015 |
| CN | 104811737 A | 7/2015 |
| CN | 104935938 A | 9/2015 |
| EP | 2 683 165 A1 | 1/2014 |
| JP | 2000-32456 A | 1/2000 |
| JP | 2004-364333 A | 12/2004 |
| JP | 2012-80151 A | 4/2012 |
| JP | 2013-153422 A | 8/2013 |
| KR | 10-0832872 B1 | 5/2008 |
| KR | 10-2009-0067176 A | 5/2009 |
| KR | 10-2013-0002242 A | 1/2013 |
| KR | 10-2015-0146471 A | 12/2015 |
| WO | WO 2010/090335 A1 | 8/2010 |
| WO | WO 2012/059577 A1 | 5/2012 |
| WO | WO 2012/081879 A1 | 6/2012 |
| WO | WO 2012/096095 A1 | 7/2012 |
| WO | WO 2014/010537 A1 | 1/2014 |

OTHER PUBLICATIONS

International Search Report issued on Mar. 2, 2017, in counterpart International Application No. PCT/KR2016/013366 (2 pages in English, 2 pages in Korean).

Kordasiewicz, Roman C., et al., "Encoding of Affine Motion Vectors." IEEE transactions on multimedia 9.7 (2007): 1346-1356.

Huang, Han, et al. "Control-point representation and differential coding affine-motion compensation." IEEE Transactions on Circuits and Systems for Video Technology 23.10 (2013): 1651-1660.

Rapaka K., et al., "On intra block copy merge vector handling", Qualcomm Incorporated, Joint Collaborative Team on Video Coding (JCT-VC) of ITU-T SG 16 WP 3 and ISO/IEC JTC 1/SC 29/WG 11, JCTVC-V0049, Oct. 2015, (2 Pages in English).

Rapaka K., et al., "On intra block copy merge vector handling", Qualcomm Incorporated, Joint Collaborative Team on Video Coding (JCT-VC) of ITU-T SG 16 WP 3 and ISO/IEC JTC 1/SC 29/WG 11, JCTVC-V0049r1, Oct. 2015, (2 Pages in English).

\* cited by examiner $$x' = x\cos\Theta - y\sin\Theta$$
$$y' = x\sin\Theta - y\cos\Theta$$

$$\begin{bmatrix} x' \\ y' \\ 1 \end{bmatrix} = \begin{bmatrix} \cos\Theta & -\sin\Theta & 0 \\ \sin\Theta & \cos\Theta & 0 \\ 0 & 0 & 1 \end{bmatrix} \begin{bmatrix} x \\ y \\ 1 \end{bmatrix}$$

FIG. 14

$p' = Hp$ $$H = \begin{bmatrix} h_1 & h_2 & h_3 \\ h_4 & h_5 & h_6 \\ h_7 & h_8 & h_9 \end{bmatrix} \quad p = \begin{bmatrix} x \\ y \\ 1 \end{bmatrix} \quad p' = \begin{bmatrix} x' \\ y' \\ 1' \end{bmatrix}$$

$$x' = \frac{h_1 x + h_2 y + h_3}{h_7 x + h_8 y + h_9} \quad \xrightarrow{k_n = h_n/h_9} \quad x' = \frac{k_1 x + k_2 y + k_3}{k_7 x + k_8 y + 1} \quad \Rightarrow \quad k_1 x + k_2 y + k_3 - k_7 x x' - k_8 y x' = x'$$

$$y' = \frac{h_4 x + h_5 y + h_6}{h_7 x + h_8 y + h_9} \qquad y' = \frac{k_4 x + k_5 y + k_6}{k_7 x + k_8 y + 1} \qquad k_4 x + k_5 y + k_6 - k_7 x x' - k_8 y x' = y'$$

FIG. 15

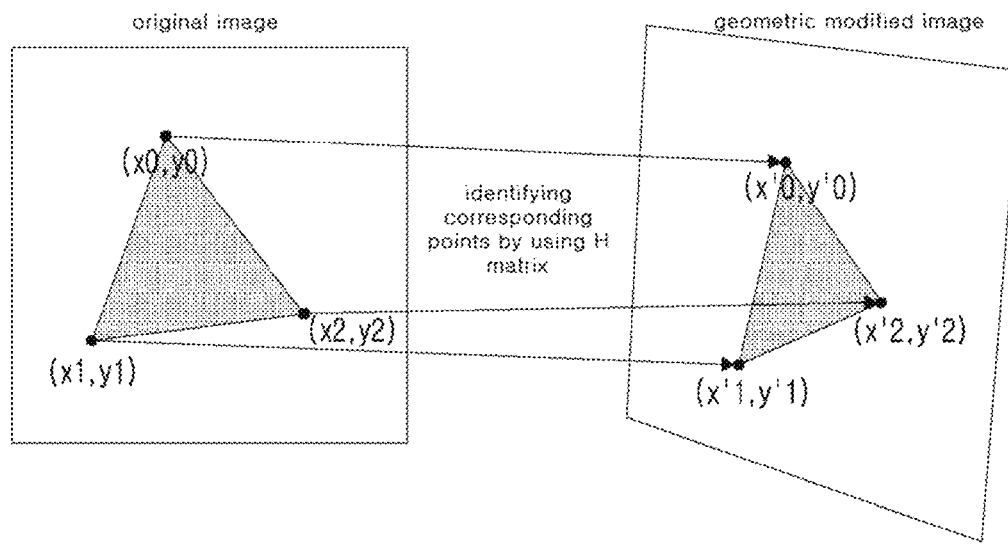

$$\begin{aligned} x' &= f(x, y, \alpha) \\ y' &= g(x, y, \beta) \end{aligned} \quad \Rightarrow \quad \begin{bmatrix} x' \\ y' \\ 1 \end{bmatrix} = H \begin{bmatrix} x \\ y \\ 1 \end{bmatrix} \quad H = \begin{bmatrix} h_1 & h_2 & h_3 \\ h_4 & h_5 & h_6 \\ h_7 & h_8 & h_9 \end{bmatrix}$$

FIG. 33
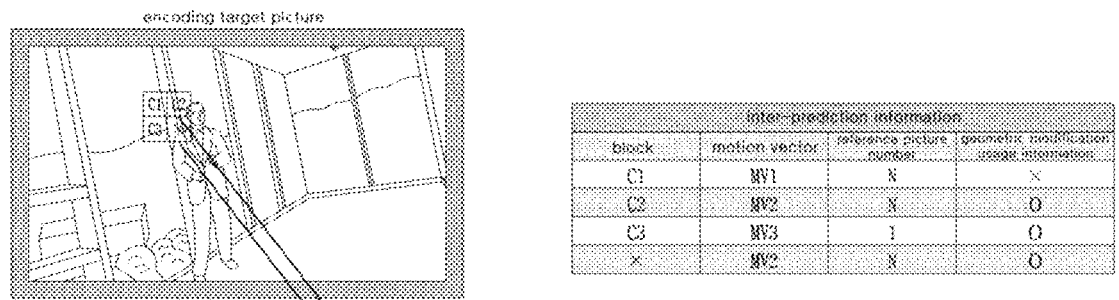
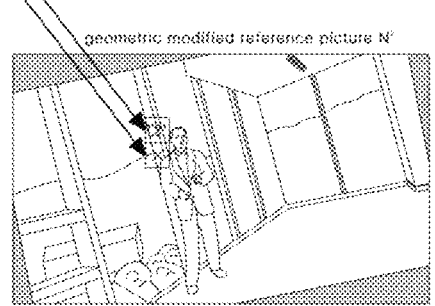
FIG. 34
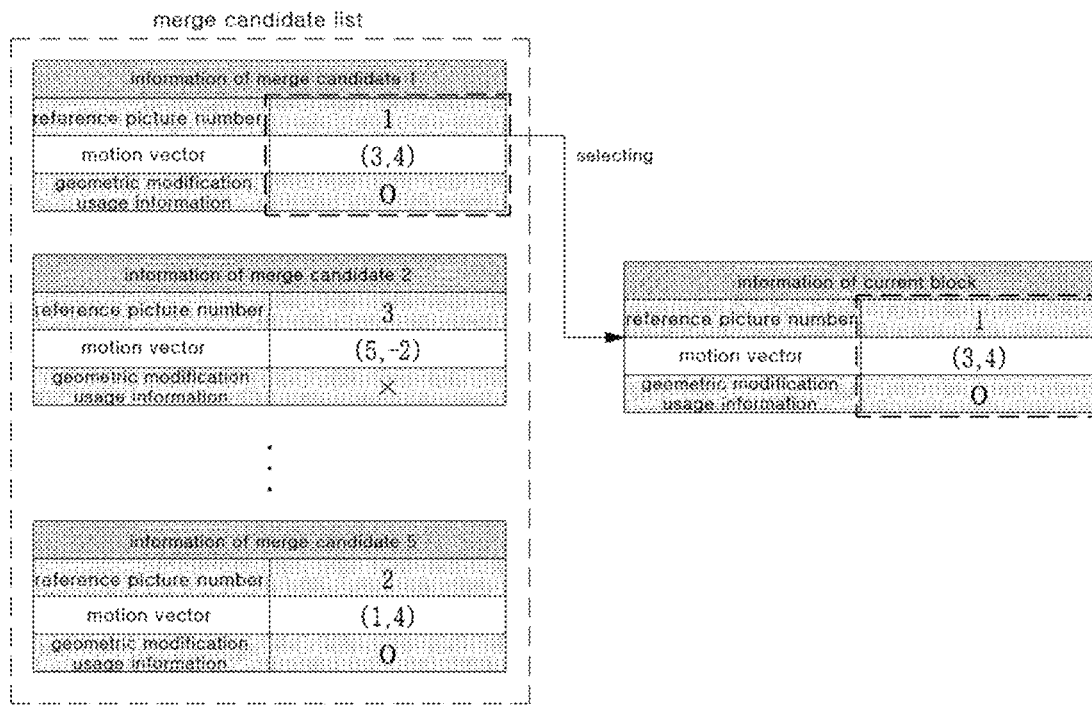

METHOD AND DEVICE FOR ENCODING/DECODING IMAGE BY USING GEOMETRICALLY CHANGED IMAGE

CROSS REFERENCE TO RELATED APPLICATIONS

This application is a Continuation Application of U.S. patent application Ser. No. 17/972,894, filed on Oct. 25, 2022, which is a continuation of application Ser. No. 17/160, 845 filed on Jan. 28, 2021, now U.S. Pat. No. 11,516,463 issued on Nov. 29, 2022, which is a continuation of application Ser. No. 15/777,562 filed on May 18, 2018, now U.S. Pat. No. 10,944,962 issued on Mar. 9, 2021, which is a U.S. National Stage Application of International Application No. PCT/KR2016/013366, filed on Nov. 18, 2016, which claims the benefit under 35 USC 119 (a) and 365 (b) of Korean Patent Application No. 10-2015-0163494, filed on Nov. 20, 2015, in the Korean Intellectual Property Office.

TECHNICAL FIELD

The present invention relates generally to a method and apparatus for encoding/decoding an image by using a geometrically modified image generated by geometrically modifying a reference image.

BACKGROUND ART

As High Definition (HD) broadcasting is extended and provided nationwide and worldwide, many users have become accustomed to images having high resolution and high picture quality. Accordingly, many institutions are providing an impetus for the development of the next-image device. Furthermore, as there is a growing interest in Ultra High Definition (UHD), which has a resolution for times higher than HDTV, there is a need for technology in which an image having higher resolution and higher picture quality can be compressed and processed.

As an image compression technology, there are various technologies such as inter prediction technology in which pixel values included in a current picture are predicted from pictures before or after the current picture, an intra-prediction technology in which pixel values included in a current picture are predicted using pixel information in the current picture, a transformation and quantization technology for compressing energy of residual signals, and an entropy encoding technology in which a short code is allocated to a value having high appearance frequency and a long code is allocated to a value having low appearance frequency. The image data may be transmitted and stored in a state in which it is effectively compressed using these image compression technologies.

When a global motion is included in a reference picture that is referenced during inter prediction, similarity between the reference picture and a current picture is lowered. The lowered similarity between the reference picture and the current picture may cause a degradation of prediction efficiency. Therefore, improvements to solve the above problems are required.

DISCLOSURE

Technical Problem

The present invention is intended to propose a method and apparatus for efficiently encoding/decoding an image.

In addition, the present invention provides a method and apparatus for intra prediction and/or inter prediction by referencing a reference picture and/or a geometric modified reference picture.

In addition, the present invention provides a method and apparatus for encoding information related to a geometric modified picture.

Technical objects to be achieved by the present invention are not limited to the above-described objects and other technical objects that have not been described will be understood by those skilled in the art from the following description.

Technical Solution

According to one aspect of the present invention, there is provided a method for encoding an image. The method may comprise generating a geometric modified reference picture by geometrically modifying a reference picture; generating a prediction block of a current block within an encoding target picture by performing inter prediction by referencing the reference picture or the geometric modified reference picture; and encoding inter-prediction information of the current block.

According to the encoding method of the present invention, the method may further comprise generating geometric modification information based on a relation between the encoding target picture and the reference picture, and the geometric modified reference picture may be generated based on the geometric modified information.

According to the encoding method of the present invention, the prediction block may be selected from either a first prediction block generated by inter prediction referencing the reference picture or a second prediction block generated by inter prediction referencing the geometric modified reference picture.

According to the encoding method of the present invention, the selected prediction block may be selected based on an encoding efficiency of the current block for each of the first prediction block and the second prediction block.

According to the encoding method of the present invention, the encoding efficiency of the current block may be determined based on a rate-distortion cost.

According to the encoding method of the present invention, the encoding the inter-prediction information may be performed by predicting from inter-prediction information of a block adjacent to the current block.

According to the encoding method of the present invention, the encoding the inter-prediction information may comprise generating a candidate list constructed with one or more candidate blocks adjacent to the current block; selecting one of the candidate blocks included in the candidate list; and encoding information that identifies the selected candidate block among the candidate blocks included in the candidate list.

According to the encoding method of the present invention, the inter-prediction information may include geometric modification usage information, and the geometric modification usage information may be information indicating whether or not the reference picture or the geometric modified reference picture is used for generating the prediction block of the current block.

According to the encoding method of the present invention, the geometric modification usage information may be encoded in a symbol value corresponding to a combination of information on each prediction direction and geometric modification usage information for each prediction direction when a bi or more directional prediction is used for generating the prediction block of the current block.

According to the encoding method of the present invention, the encoding the symbol value may be performed by encoding a difference value between the symbol value and a symbol value corresponding to geometric modification usage information that was previously used.

According to another aspect of the present invention, there is provided a method for decoding an image. The method may comprise decoding inter-prediction information of a current block; and generating a prediction block of the current block within a decoding target picture by performing inter prediction based on the inter-prediction information, According to the decoding method of the present invention, the inter-prediction information may include geometric modification usage information, and the geometric modification usage information may be information indicating whether a reference picture or a geometric modified reference picture is used for generating the prediction block of the current block.

According to the decoding method of the present invention, when the geometric modification usage information indicates that the geometric modified reference picture is used, the decoding method may further comprise decoding geometric modification information; and generating the geometric modified reference picture by geometrically modifying the reference picture based on the geometric modification usage information, and the prediction block of the current block may be generated by inter prediction referencing the geometric modified reference picture.

According to the decoding method of the present invention, the inter-prediction information may be decoded by predicting inter-prediction information of a block that is adjacent to the current block.

According to the decoding method of the present invention, the decoding the inter-prediction information may comprise generating a candidate list constructed with one or more candidate blocks adjacent to the current block; decoding information that identifies one candidate block among the candidate blocks included in the candidate list; selecting one candidate block among the candidate blocks included in the candidate list based on the identification information; and deriving the inter-prediction information of the current block by using inter-prediction information of the selected candidate block.

According to the decoding method of the present invention, the method may further comprise determining the inter-prediction information of the selected candidate block as the inter-prediction information of the current block.

According to the decoding method of the present invention, the geometric modification usage information may be decoded in a symbol value corresponding to a combination of information on each prediction direction and geometric modification usage information for each prediction direction when a bi or more directional prediction is used for generating the prediction block of the current block.

According to the decoding method of the present invention, the decoding the symbol value may comprise decoding a difference value between the symbol value and a symbol value corresponding to geometric modification usage information that was previously used; and adding the symbol value corresponding to geometric modification usage information that was previously used to the decoded difference value.

According to the decoding method of the present invention, the geometric modification information may be generated based on a relation between the decoding target picture and the reference picture, and may have various forms such as global motion information (a global motion vector), a transfer geometric modification matrix, a size geometric modification matrix, a rotation geometric modification matrix, an affine geometric modification matrix and a projection geometric modification matrix.

According to still another aspect of the present invention, there is provided an apparatus for encoding an image. the apparatus may comprise a geometric modified reference picture generator generating a geometric modified reference picture by geometrically modifying a reference picture; an inter-prediction unit generating a prediction block of a current block within an encoding target picture by performing inter prediction by referencing the reference picture or the geometric modified reference picture; and an encoder encoding inter-prediction information of the current block.

According to yet another aspect of the present invention, there is provided an apparatus for decoding an image. The apparatus may comprise a decoder decoding inter-prediction information of a current block; and an inter-prediction unit generating a prediction block of the current block within a decoding target picture by performing inter prediction based on the inter-prediction information, and wherein the inter-prediction information may include geometric modification usage information, and the geometric modification usage information may be information indicating whether a reference picture or a geometric modified reference picture is used for generating the prediction block of the current block.

Advantageous Effects

According to the present invention, an image may be efficiently encoded/decoded.

In addition, according to the present invention, inter prediction and/or intra prediction may be performed by referencing a reference picture and/or a geometric modified picture.

Further, according to the present invention, information related to the geometric modified picture may be efficiently encoded.

Effects obtainable from the present invention are not limited by the above mentioned effect, and, other unmentioned effects can be clearly understood from the following description by those having ordinary skill in the technical field to which the present invention pertains.

DESCRIPTION OF DRAWINGS

FIG. 14 is an example method of deriving a relation□| formula between two points corresponding within two images according to the present invention.

FIG. 15 is a diagram showing a method of generating a geometrically modified image based on a geometric modification matrix and an original image according to the present invention.

FIG. 33 is a diagram explaining an embodiment of predicting inter-prediction information of a current block based on a merge candidate.

FIG. 34 is a diagram explaining an embodiment method of predicting inter-prediction information of a current block based on a merge candidate list.

MODE FOR INVENTION

Figure 1:
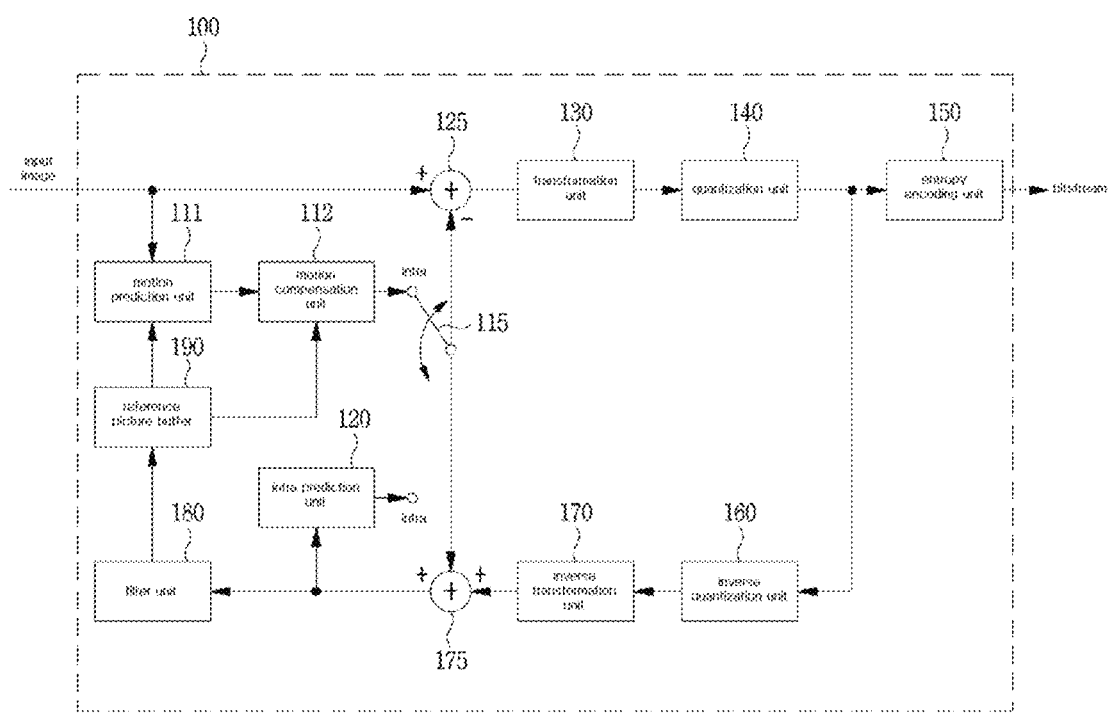
FIG. 1 is a block diagram showing a configuration of an image encoding apparatus to which an embodiment of the present invention is applied.

Since a variety of modifications may be made to the present invention and there are various embodiments of the present invention, examples will now be provided with reference to drawings and will be described in detail. However, the present invention is not limited thereto, and the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity, and the same reference numerals will be used throughout to designate the same or like elements. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range equivalent to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention and the 'second' component may also be similarly named the 'first' component. The term 'and/or' includes a combination of a plurality of items or any one of a plurality of terms.

When an element is mentioned to be "coupled" or "connected" to another element, this may mean that it is directly coupled or connected to the other element, but it is to be understood that yet another element may exist in-between. On the other hand, when an element is mentioned to be "directly coupled" or "directly connected" to another element, it is to be understood that there are no other elements in-between.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc., are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, exemplary embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may refer to a picture constituting a video, or may refer to a video. For example, "encoding and/or decoding an image" may refer to "encoding and/or decoding a video", or may refer to "encoding and/or decoding a single image among images constituting a video". Herein, the picture may refer to an image.

Encoder: may refer to an encoding apparatus.

Decoder: may refer to a decoding apparatus.

Parsing: may refer to determining a syntax element value by performing entropy decoding, or may refer to an entropy decoder.

Block: may refer to a sample of an M×N matrix. Herein, M and N are positive integers. A block may refer to a sample matrix of a two dimensional matrix.

Unit: may refer to a unit of encoding or decoding an image. When encoding and decoding an image, a unit may be an area generated by partitioning an image. Alternatively, a unit may refer to a divided unit of one image when the image is sub-divided and encoded or decoded. While encoding and decoding, a predetermined process may be performed for each unit. A single unit may be divided into smaller sub-units. The unit may also refer to a block, a macro block (MB), a coding unit (CU), a prediction unit (PU), a transform unit (TU), a coding block (CB), a prediction block (PB), or a transform block (TB) according to a function thereof. The unit may refer to a luma component block to be distinguished from the block, a chroma component block in response to the luma component block, and may refer to each block including a syntax element thereof. The unit may have various sizes and shapes. In particular, the shape of the unit may include two-dimensional forms such as a rectangle, cube, trapezoid, triangle, pentagon, etc. In addition, the shape of the unit may include a geometrical figure. Further, unit information may include at least one of a unit type such as encoding unit, prediction unit, transform unit, etc.; a unit size; a unit depth; and a sequence of unit encoding and decoding, etc.

Reconstructed neighbor unit: may refer to a reconstructed unit that is already spatially/temporally encoded or decoded, and adjacent to an encoding/decoding target unit.

Depth: indicates a degree of partitions of a unit. In a tree structure, the highest node may refer to a root node, and the lowest node may refer to a leaf node.

Symbol: may refer to a syntax element and a coding parameter of an encoding/decoding target unit, a value of transform coefficient, etc.

Parameter set: may correspond to header information in a structure within a bit stream. At least one of a video parameter set, a sequence parameter set, a picture parameter set, and an adaptation parameter set may be included in the parameter set. In addition, the parameter set may include information of a slice header and a tile header.

Bitstream: may refer to a bit string including encoded image information.

Coding parameter: may include not only information encoded by an encoder and then transmitted to a decoder along with a syntax element, but also information that may be derived in an encoding or decoding process, or may refer to a parameter necessary for encoding and decoding. For example, the coding parameter may include at least one value and/or statistic of an intra-prediction mode, an inter-prediction mode, an intra-prediction direction, motion information, a motion vector, a reference image index, an inter-prediction direction, an inter-prediction indicator, a reference image list, a motion vector predictor, a motion merge candidate, a type of transform, a size of transform, information about whether or not an additional transform is used, filter information within a loop, information about whether or not a residual signal is present, a quantization parameter, a context model, a transform coefficient, a transform coefficient level, a coded block pattern, a coded block flag, an image displaying/outputting order, slice information, tile information, a picture type, information about whether or not a motion merge mode is used, information about whether or not a skip mode is used, a block size, a block depth, block partition information, a unit size, unit partition information, etc.

Prediction unit: may refer to a basic unit when performing inter prediction or intra prediction, and when performing compensation for the prediction. The prediction unit may be divided into multiple partitions. Each of the partitions may also be the basic unit when performing inter prediction or intra prediction, and when performing the compensation for the prediction. The partitioned prediction unit may also refer to a prediction unit. In addition, a single prediction unit may be divided into smaller sub-units. The prediction unit may have various sizes and shapes. In particular, the shape of the unit may include two-dimensional forms such as a rectangle, square, trapezoid, triangle, pentagon, etc. In addition, the shape of the unit may include a geometrical figure.

Prediction unit partition: may refer to a partitioning form of a prediction unit.

Reference picture list: may refer to a list including at least one reference picture that is used for inter prediction or motion compensation. Types of the reference list may include a list combined (LC), L0 (List 0), L1 (List 1), L2 (List 2), L3 (List 3), etc. At least one reference picture list may be used for inter prediction.

Inter-prediction indicator: may refer to an inter-prediction direction (uni-direction prediction, bi-direction prediction) of an encoding/decoding target block. Alternatively, the indicator may refer to a number of reference pictures used for generating a prediction block of the encoding/decoding target block, or may refer to a number of prediction blocks used when the encoding/decoding target block performs motion compensation.

Reference picture index: may refer to an index of a specific picture within a reference picture list.

Reference picture: may refer to a reference picture that is referenced by a specific unit used for inter prediction or motion compensation. Alternately, a reference image may refer to a reference picture.

Motion vector: refers to a two-dimensional matrix used for inter prediction or motion compensation, or may be an offset between an encoding/decoding target image and a reference image. For example, (mvX, mvY) may indicate a moving vector, mvX may be a horizontal component, and mvY may be vertical component.

Motion vector candidate: may refer to a unit that becomes a prediction candidate when predicting a motion vector, or may refer to a moving vector of the unit.

Motion vector candidate list: may refer to a list configured with a moving vector candidate.

Motion vector candidate index: may refer to an indicator that indicates a motion vector candidate within a moving vector candidate list, or may refer to an index of a motion vector predictor.

Motion information: may refer to information including at least one of a motion vector, a reference image index, an inter-prediction indicator, reference image list information, a reference image, a motion vector candidate, a motion vector candidate index, etc.

Transform unit: may refer to a basic unit when performing encoding/decoding of a residual signal such as transform, inverse transform, quantization, inverse quantization, and encoding/decoding of transform coefficient. A single unit may be divided into smaller sub-units. The unit may have various sizes and shapes. In particular, the shape of the unit may include a two-dimensional form such as a rectangle, square, trapezoid, triangle, pentagon, etc. In addition, the shape of the unit may also include a geometrical figure.

Scaling: may refer to a process of multiplying a factor to a transform coefficient level, and as a result, a transform coefficient may be generated. The scaling may also refer to inverse quantization.

Quantization parameter: may refer to a value used for scaling a transform coefficient level in a quantization and inverse quantization. Herein, a quantization parameter may be a value mapped to a step size of the quantization.

Delta quantization parameter: may refer to a residual value between a predicted quantization parameter and a quantization parameter of an encoding/decoding target unit.

Scan: may refer to a method of sorting coefficient orders within a block or a matrix. For example, sorting a two-dimensional matrix to a one dimensional matrix may refer to scanning or inverse scanning.

Transform coefficient: may be a coefficient value generated after performing a transform. In the present invention, a transform coefficient level that is quantized by applying quantization to a transform coefficient may be included in the transform coefficient.

Non-zero transform coefficient: may refer to a transform coefficient in which a value thereof or a size thereof is not 0.

Quantization matrix: may refer to a matrix used for quantization and inverse quantization in order to improve quality of an image. The quantization matrix may also refer to a scaling list.

Quantization matrix coefficient: may refer to each element of a quantization matrix. The quantization matrix coefficient may also refer to a matrix coefficient.

Default matrix: may refer to a predetermined quantization matrix defined in an encoder and a decoder in advance.

Non-default matrix: may refer to a quantization matrix transmitted from/received by a user, and is not defined in an encoder and a decoder in advance.

FIG. 1 is a block diagram showing a configuration of an image encoding apparatus to which an embodiment of the present invention is applied.

The encoding apparatus 100 may be a video encoding apparatus or an image encoding apparatus. A video may include at least one image. The encoding apparatus 100 may encode the at least one image of the video in order of time.

Referring to FIG. 1, the encoding apparatus 100 may include a motion prediction unit 111, motion compensation unit 112, an intra-prediction unit 120, a switch 115, a subtractor 125, a transformation unit 130, a quantization unit 140, an entropy encoding unit 150, a inverse quantization unit 160, an inverse transformation unit 170, an adder 175, a filter unit 180, and a reference picture buffer 190.

The encoding apparatus 100 may encode an input image in an intra mode or an inter mode or both. In addition, the encoding apparatus 100 may generate a bitstream by encoding the input image, and may output the generated bitstream. When the intra mode is used as a prediction mode, the switch 115 may be switched to intra. When the inter mode is used as a prediction mode, the switch 115 may be switched to inter. Herein, the intra mode may be referred to as an intra-prediction mode, and the inter mode may be referred to as an inter-prediction mode. The encoding apparatus 100 may generate a prediction signal of an input block of the input image. The prediction signal, which is a block unit, may be referred to as a prediction block. In addition, after generating the prediction block, the encoding apparatus 100 may encode a residual value between the input block and the prediction block. The input image may be referred to as a current image that is a target of a current encoding. The input block may be referred to as a current block or as an encoding target block that is a target of the current encoding.

When the prediction mode is the intra mode, the intra-prediction unit 120 may use a pixel value of a previously encoded block adjacent to the current block as a reference pixel. The intra-prediction unit 120 may perform spatial prediction by using the reference pixel for spatial prediction, and may generate prediction samples of the input block by using the spatial prediction. Herein, intra prediction may mean intra-frame prediction.

When the prediction mode is the inter mode, the motion prediction unit 111 may search for a region that is optimally matched with the input block of a reference image in a motion predicting process, and may derive a motion vector by using the searched region. The reference image may be stored in the reference picture buffer 190.

The motion compensation unit 112 may generate the prediction block by performing motion compensation using the motion vector. Herein, the motion vector may be a two-dimensional vector that is used in inter prediction. In addition, the motion vector may indicate an offset between the current image and the reference image. Herein, inter prediction may refer to an inter-frame prediction.

When a value of the motion vector is not an integer, the motion prediction unit 111 and the motion compensation unit 112 may generate the prediction block by applying an interpolation filter to a partial region in the reference image. In order to perform inter prediction or the motion compensation, based on the coding unit, a motion prediction method of the prediction unit included in the coding unit and a compensation method of the motion prediction may be determined among a skip mode, a merge mode, and an AMVP mode. In addition, the inter prediction or the motion compensation may be performed depending on the modes.

The subtractor 125 may generate a residual block by using the residual value between the input block and the prediction block. The residual block may be referred to as a residual signal.

The transformation unit 130 may generate a transform coefficient by transforming the residual block, and may output the transform coefficient. Herein, the transform coefficient may be a coefficient value generated by transforming the residual block. In a transform skip mode, the transformation unit 130 may skip the transformation of the residual block.

A quantized transform coefficient level may be generated by applying quantization to the transform coefficient. Hereinafter, the quantized transform coefficient level may be referred to as the transform coefficient in the embodiments of the present invention.

The quantization unit 140 may generate the quantized transform coefficient level by quantizing the transform coefficient according to the quantization parameter, and may output the quantized transform coefficient level. Here, the quantization unit 140 may quantize the transform coefficient by using a quantization matrix.

The entropy encoding unit 150, according to the probability distribution, may generate the bitstream by performing entropy encoding on values calculated by the quantization unit 140 or on coding parameter values calculated in an encoding process, etc., and may output the bitstream. The entropy encoding unit 150 may entropy encode information for decoding an image, and information of a pixel of an image. For example, the information for decoding an image may include a syntax element, etc.

When the entropy encoding is applied, symbols are represented by allocating a small number of bits to the symbols having high occurrence probability and allocating a large number of bits to the symbols having low occurrence probability, thereby reducing the size of the bitstream of encoding target symbols. Therefore, compression performance of the image encoding may be increased through the entropy encoding. For the entropy encoding, the entropy encoding unit 150 may use an encoding method such as exponential golomb, context-adaptive variable length coding (CAVLC), and context-adaptive binary arithmetic coding (CABAC). For example, the entropy encoding unit 150 may entropy encode by using a variable length coding/code (VLC) table. In addition, the entropy encoding unit 150 may derive a binarization method of the target symbol and a probability model of a target symbol/bin, and may perform arithmetic coding by using the derived binarization method or the derived probability model thereafter.

In order to encode the transform coefficient level, the entropy encoding unit 150 may change a two-dimensional block form coefficient into a one-dimensional vector form by using a transform coefficient scanning method. For example, the two-dimensional block form coefficient may be changed into the one-dimensional vector form by scanning the coefficient of the block with up-right scanning. According to the size of the transform unit and the intra prediction mode, vertical scanning that scans the two-dimensional block form coefficient in column direction, and horizontal scanning that scans the two-dimensional block form coefficient in a row direction may be used rather than up-right scanning. In other words, the scanning method among up-right scanning, vertical direction scanning, and horizontal direction scanning may be determined according to the size of the transform unit and the intra-prediction mode.

The coding parameter may include not only information encoded by an encoder and then delivered to a decoder along with a syntax element, but also information that may be derived in an encoding or decoding process, or may refer to a parameter necessary for encoding and decoding. For example, the coding parameter may include at least one value or statistic of an intra-prediction mode, an inter-prediction mode, an intra-prediction direction, motion information, a motion vector, a reference image index, an inter-prediction direction, an inter-prediction indicator, a reference image list, a motion vector predictor, a motion merge candidate, a type of transform, a size of transform, information about whether or not an additional transform is used, filter information within a loop, information about whether or not a residual signal is present, a quantization parameter, a context model, a transform coefficient, a transform coefficient level, a coded block pattern, a coded block flag, an image displaying/outputting order, slice information, tile information, a picture type, information about whether or not a motion merge mode is used, information about whether or not a skip mode is used, a block size, a block depth, block partition information, a unit size, unit partition information, etc.

The residual signal may mean the difference between the original signal and the prediction signal. Alternatively, the residual signal may be a signal generated by transforming the difference between the original signal and the prediction signal. Alternatively, the residual signal may be a signal generated by transforming and quantizing the difference between the original signal and the prediction signal. The residual block may be the residual signal, which is a block unit.

When the encoding apparatus 100 performs encoding by using inter prediction, the encoded current image may be used as the reference image for another image(s) that will be processed thereafter. Therefore, the encoding apparatus 100 may decode the encoded current image, and may store the decoded image as the reference image. In order to perform the decoding, inverse quantization and inverse transformation may be performed on the encoded current image.

A quantized coefficient may be dequantized by the inverse quantization unit 160, and may be inversely transformed by the inverse transformation unit 170. The dequantized and inversely transformed coefficient may be added to the prediction block by the adder 175, whereby a reconstructed block may be generated.

The reconstructed block may pass the filter unit 180. The filter unit 180 may apply at least one of a deblocking filter, a sample adaptive offset (SAO), and an adaptive loop filter (ALF) to the reconstructed block or a reconstructed image. The filter unit 180 may be referred to as an in-loop filter.

The deblocking filter may remove block distortion that occurs at boundaries between the blocks. In order to determine whether or not the deblocking filter is operated, it is possible to determine whether or not the deblocking filter is applied to the current block based on pixels included in several rows or columns in the block. When the deblocking filter is applied to the block, a strong filter or a weak filter may be applied depending on required deblocking filtering strength. In addition, in applying the deblocking filter, horizontal direction filtering and vertical direction filtering may be processed in parallel when performing vertical filtering and horizontal filtering.

The sample adaptive offset may add an optimum offset value to the pixel value in order to compensate for an encoding error. The sample adaptive offset may correct an offset between the deblocking filtered image and the original image by a pixel. In order to perform the offset correction on a specific picture, it is possible to use a method of applying an offset correction in consideration of edge information of each pixel or a method of partitioning pixels of an image into a predetermined number of regions, determining a region to be subjected to perform an offset correction, and applying the offset correction to the determined region.

The adaptive loop filter may filter based on a value obtained by comparing the reconstructed image and the original image. Pixels of an image may be partitioned into predetermined groups, a single filter being applied to each of the groups is determined, and different filtering may be performed at each of the groups. Information about whether or not the adaptive loop filter is applied may be transmitted to each coding unit (CU). A shape and a filter coefficient of an adaptive loop filter being applied to each block may vary. In addition, an adaptive loop filter having the same form (fixed form) may be applied regardless of characteristics of a target block.

The reconstructed block having passed the filter unit 180 may be stored in the reference picture buffer 190.

Figure 2:
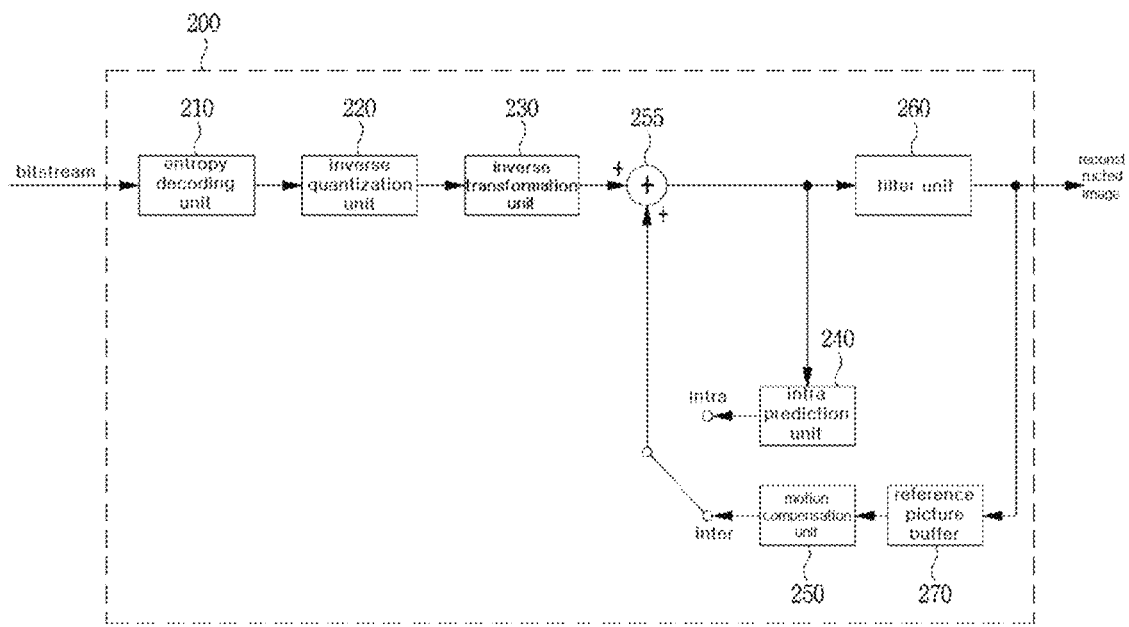
FIG. 2 is a block diagram showing a configuration of an image decoding apparatus to which an embodiment of the present invention is applied.

FIG. 2 is a block diagram showing a configuration of an image decoding apparatus to which an embodiment of the present invention is applied.

The decoding apparatus 200 may be a video decoding apparatus or an image decoding apparatus.

Referring to FIG. 2, the decoding apparatus 200 may include an entropy decoding unit 210, a inverse quantization unit 220, an inverse transformation unit 230, an intra-prediction unit 240, motion compensation unit 250, an adder 255, a filter unit 260, and a reference picture buffer 270.

The decoding apparatus 200 may receive the bitstream outputted from the encoding apparatus 100. The decoding apparatus 200 may decode the bitstream in the intra mode or the inter mode. In addition, the decoding apparatus 200 may generate a reconstructed image by decoding, and may output the reconstructed image.

When the intra mode is used as a prediction mode used in decoding, the switch may be switched to intra. When the inter mode is used as the prediction mode used in decoding, the switch may be switched to inter.

The decoding apparatus 200 may obtain the reconstructed residual block from the inputted bitstream, and may generate the prediction block.

When the reconstructed residual block and the prediction block are obtained, the decoding apparatus 200 may generate the reconstructed block, which is a decoding target block, by adding the reconstructed residual block and the prediction block. The decoding target block may be referred to as a current block.

The entropy decoding unit 210 may generate symbols by entropy decoding the bitstream according to the probability distribution. The generated symbols may include a symbol having a form of a quantized transform coefficient level.

Herein, a method of entropy decoding may be similar to the above-described method of the entropy encoding. For example, the method of entropy decoding may be an inverse process of the above described method of entropy encoding.

In order to decode the transform coefficient level, the entropy decoding unit 210 may change a one-dimensional block form coefficient into a two-dimensional vector form by using a transform coefficient scanning method. For example, the one-dimensional block form coefficient may be changed into the two-dimensional vector form by scanning the coefficient of the block with up-right scanning. According to the size of the transform unit and the intra-prediction mode, vertical scanning and horizontal scanning may be used rather than up-right scanning. In other words, the scanning method among up-right scanning, vertical direction scanning, and horizontal direction scanning may be determined according to the size of the transform unit and the intra-prediction mode.

The quantized transform coefficient level may be dequantized by the inverse quantization unit 220, and may be inversely transformed by the inverse transformation unit 230. The quantized transform coefficient level is dequantized and is inversely transformed so as to generate a reconstructed residual block. Here, the inverse quantization unit 220 may apply the quantization matrix to the quantized transform coefficient level.

When the intra mode is used, the intra-prediction unit 240 may generate a prediction block by performing the spatial prediction that uses the pixel value of the previously decoded block around the decoding target block.

When the inter mode is used, the motion compensation unit 250 may generate the prediction block by performing motion compensation that uses both the motion vector and the reference image stored in the reference picture buffer 270. When the value of the motion vector is not an integer, the motion compensation unit 250 may generate the prediction block by applying the interpolation filter to the partial region in the reference image. In order to perform motion compensation, based on the coding unit, a motion prediction method of the prediction unit included in the coding unit and a compensation method of the motion prediction may be determined among a skip mode, a merge mode, an AMVP mode, and a current picture reference mode. In addition, the inter prediction or the motion compensation may be performed depending on the modes. Herein, the current picture reference mode may mean a prediction mode using a previously reconstructed region within the current picture having the decoding target block. The previously reconstructed region may be not adjacent to the decoding target block. In order to specify the previously reconstructed region, a fixed vector may be used for the current picture reference mode. In addition, a flag or an index indicating whether or not the decoding target block is a block decoded in the current picture reference mode may be signaled, and may be derived by using the reference picture index of the decoding target block. The current picture for the current picture reference mode may exist at a fixed position (for example, a position of refIdx=0 or the last position) within the reference picture list for the decoding target block. In addition, it is possible to be variably positioned within the reference picture list, and to this end, an additional reference picture index indicating a position of the current picture may be signaled.

The reconstructed residual block may be added to the prediction block by the adder 255. A block generated by adding the reconstructed residual block and the prediction block may pass the filter unit 260. The filter unit 260 may apply at least one of the deblocking filter, the sample adaptive offset, and the adaptive loop filter to the reconstructed block or to the reconstructed image. The filter unit 260 may output the reconstructed image. The reconstructed image may be stored in the reference picture buffer 270, and may be used in inter prediction.

Figure 3:
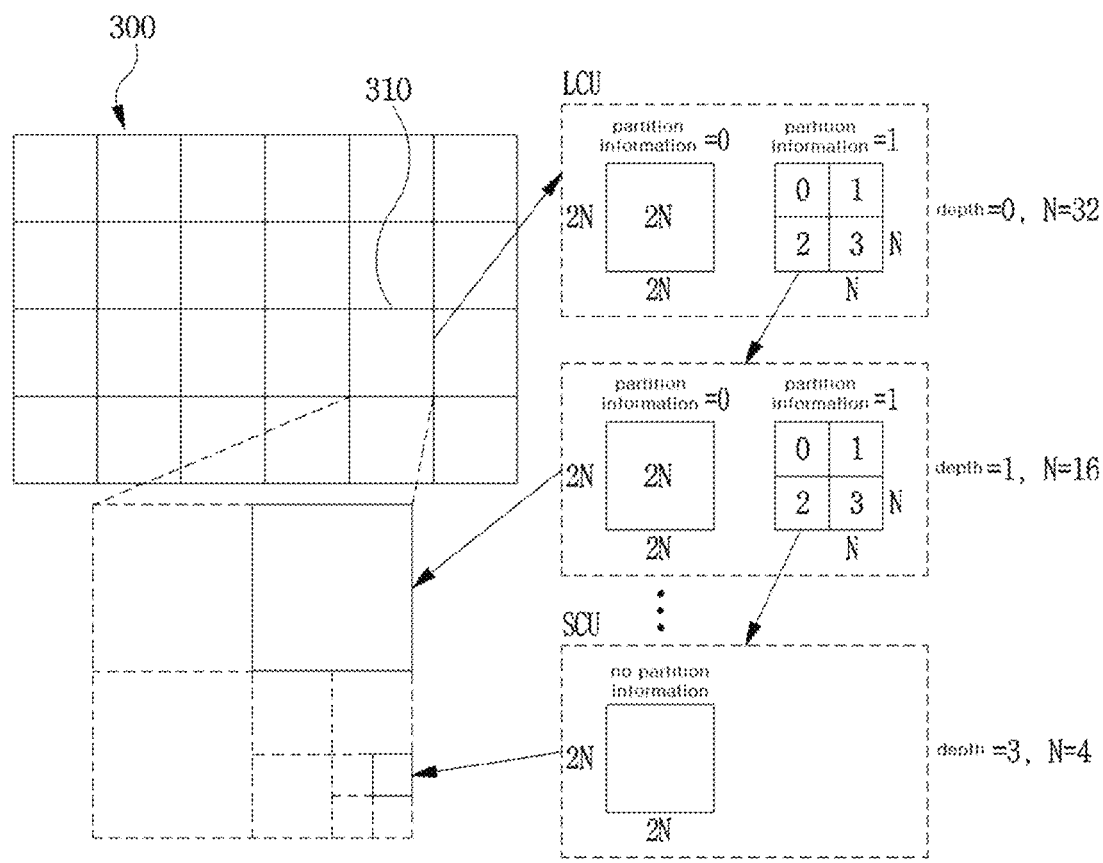
FIG. 3 is a diagram schematically showing a partition structure of an image when encoding the image.

FIG. 3 is a diagram schematically showing the partition structure of an image when encoding and decoding the image. FIG. 3 schematically shows an example of partitioning a single unit into a plurality of units of a lower layer.

In order to efficiently partition an image, a coding unit (CU) may be used while encoding and decoding. A unit may refer to 1) a syntax element, and 2) a block including sample images. For example, "a partition of a unit" may refer to "a partition of a block corresponding to the unit". Block partitioning information may include depth information of the unit. The depth information may indicate a number of partitions in the unit and/or a degree of partitioning.

Referring to FIG. 3, an image 300 is sequentially partitioned in the largest coding unit (hereinafter referred to as an LCU), and a partition structure is determined based on the LCUs. Herein, the LCU may be used as a coding tree unit (CTU). A single unit may include depth information based on a tree structure and may be hierarchically partitioned. Each of partitioned unit of a lower layer may include depth information. The depth information indicates a number of partitions in the unit and/or a degree of partitioning, and thus may include unit size information of the lower layer.

The partition structure may refer to a distribution of coding units (CUs) within the LCU 310. The CU may be a unit used for efficiently encoding an image. The distribution may be determined based on whether or not a single CU will be partitioned in plural (a positive integer more than 2 including 2, 4, 8, 16, etc.). A width size and a height size of each partitioned CU may be a half width size and a half height size of the single CU. Alternatively, the width size and the height size of each partitioned CU may be smaller than the width size and the height size of the single CU according to a number of partitioned units. Likewise, the partitioned CU may be recursively partitioned in a plurality of CUs each reduced by half in a width size and a height size from the partitioned CU.

Herein, the partition of a CU may be recursively performed up to a predetermined depth. Depth information may be information indicating a size of the CU. Depth information of each CU may be stored therein. For example, the depth of an LCU may be 0, and the depth of the smallest coding unit (SCU) may be a predetermined maximum depth.

Herein, the LCU may be a CU having a maximum CU size as described above, and the SCU may be a CU having a minimum CU size.

Whenever the LCU 310 is partitioned and a width size and a height size thereof are reduced, the depth of a CU is increased by 1. A CU on which partitioning has not been performed may have a 2 N×2 N size for each depth, and a CU on which partitioning has been performed may be partitioned from a CU having a 2 N×2 N size to a plurality of CUs each having an N×N size. The size of N is reduced by half whenever the depth is increased by 1.

Referring to FIG. 3, the size of an LCU having a minimum depth of 0 may be 64×64 pixels, and the size of a SCU having a maximum depth of 3 may be 8×8 pixels. Herein, the LCU having 64×64 pixels may be represented by a depth of 0, a CU having 32×32 pixels may be represented by a depth of 1, a CU having 16×16 pixels may be represented by a depth of 2, and the SCU having 8×8 pixels may be represented by a depth of 3.

Further, information about whether or not a specific CU will be partitioned may be represented through 1-bit partition information for each CU. All CUs, except for the SCU, may include the partition information. For example, when a CU is not partitioned, partition information may be 0. Alternatively, when a CU is partitioned, partition information may be 1.

Figure 4:
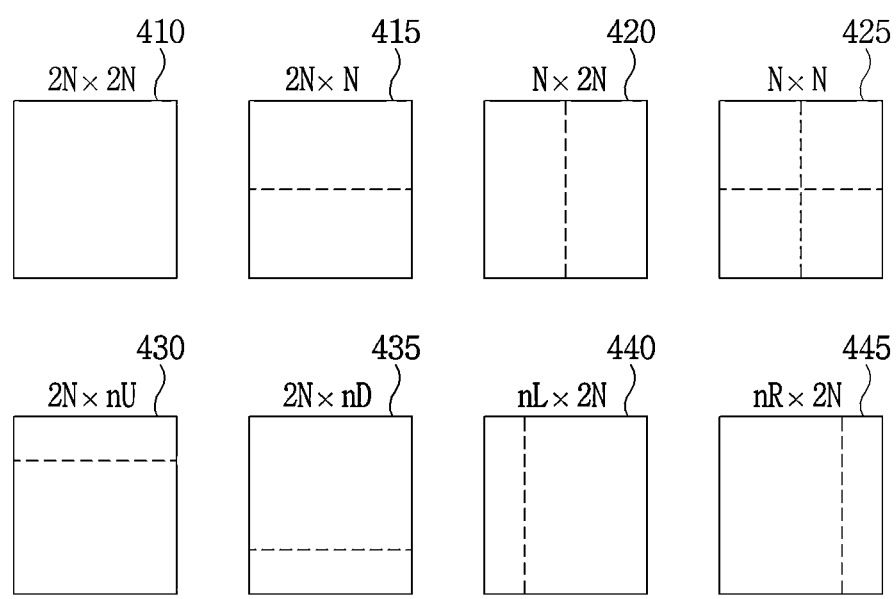
FIG. 4 is a diagram showing forms of a prediction unit (PU) that may be included in a coding unit (CU).

FIG. 4 is a diagram showing the forms of a prediction unit (PU) that may be included in a CU.

A CU that is no longer partitioned, from among CUs partitioned from the LCU, may be partitioned into at least one PU. Such a process may also refer to partitioning.

A prediction unit (PU) may be a basic unit of a prediction. The PU may be encoded and decoded in any one of a skip mode, inter-prediction mode, and intra-prediction mode. The PU may be partitioned in various forms depending on each mode.

As shown in FIG. 4, in the skip mode, there may not be a partition within the CU. In addition, a 2 N×2 N mode 410 having the same size as a CU may be supported without a partition within the CU.

In the inter-prediction mode, 8 partitioned forms, for example, the 2 N×2 N mode 410, a 2 N×2 N mode 415, an N×2 N mode 420, an N×N mode 425, a 2 N×nU mode 430, a 2 N×nD mode 435, an nL×2 N mode 440, and an nR×2 N mode 445 may be supported within a CU.

Figure 5:
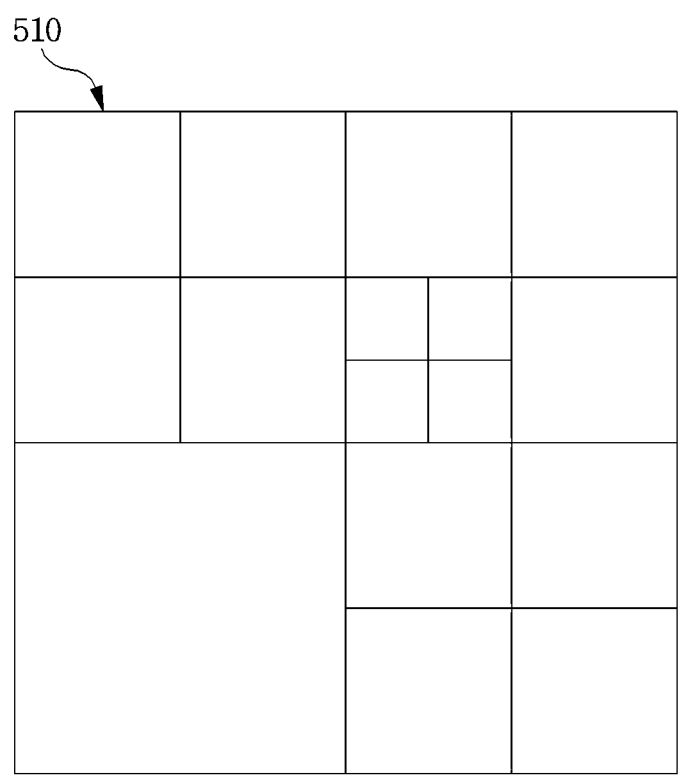
FIG. 5 is a diagram showing forms of a transform unit (TU) that may be included in a coding unit (CU).

FIG. 5 is a diagram showing forms of a transform unit (TU) that may be included in a CU.

A transform unit (TU) may be a basic unit used for a transformation, a quantization, a reverse transform, and a inverse quantization process within a CU. The TU may have a rectangular or square form. The TU may be dependently determined by a size and/or a form of a CU.

A CU that is no longer partitioned, from among CUs partitioned from the LCU, may be partitioned into one or more TUs. Herein, the partition structure of the TU may be a quad-tree structure. For example, as shown in FIG. 5, a single CU 510 may be partitioned once or more depending on a quad-tree structure, so that the CU 510 is formed of TUs having various sizes. Alternatively, the single CU 510 may be partitioned into at least one TU based in a number of horizontal lines and/or vertical lines that partition the CU. The CU may be partitioned into TUs that are symmetrical to each other, or may be partitioned into TUs that are asymmetrical to each other. In order to partition into asymmetrical TUs, information of size and form of the TU may be signaled, or may be derived from information of size and form of the CU.

While performing a transform, a residual block may be transformed by using one of predetermined methods. For example, the predetermined methods may include a discrete cosine transform (DCT), a discrete sine transform (DST), or a Karhunen-Loève transform (KLT). In order to determine the method of transforming the residual block, the method may be determined by using at least one of inter-prediction mode information of the prediction unit, intra-prediction mode information of the prediction unit, or a size and form of the transform block. Alternatively, information indicating the method may be signaled in some cases.

Figure 6:
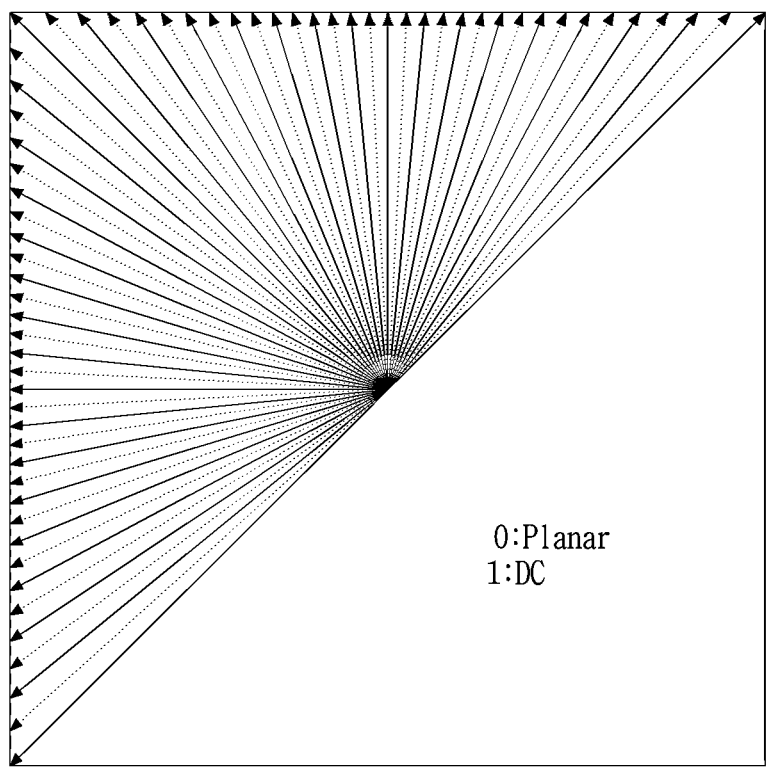
FIG. 6 is a diagram showing an example of intra-prediction process.

FIG. 6 is a diagram showing an example of showing an intra-prediction mode.

A number of intra-prediction modes may vary according to a size of a prediction unit (PU), or may be fixed to N numbers regardless of the size of the prediction unit (PU). Herein, the N numbers may include 35, and 67, or may be a positive integer more than 1. For example, a predetermined intra-prediction mode of an encoder/decoder may include two non-angular modes and 65 angular modes, as shown in FIG. 6. The two non-angular modes may include a DC mode and a planar mode.

The number of intra-prediction modes may differ according to a type of color component. For example, the number of intra-prediction modes may be varied depending on whether the color component is a luma signal or a chroma signal.

The PU may have a square form having an N×N or a 2 N×2 N size. The N×N size may include 4×4, 8×8, 16×16, 32×32, 64×64, 128×128, etc. Alternatively, the PU may have an M×N size. Herein, M and N may be a positive integer more than 2, and M and N may be different numbers. A unit of PU may be a size of at least one of CU, PU, and TU.

Intra encoding and/or decoding may be performed by using a sample value included in a neighboring reconstructed unit or a coding parameter.

In intra prediction, a prediction block may be generated by applying a reference sample filter to a reference pixel through using at least one of sizes of encoding/decoding target blocks. Types of the reference filter applied to the reference pixel may differ. For example, the reference filter may differ according to the intra-prediction mode of an encoding/decoding target block, a size/form of encoding/decoding target block, or a position of the reference pixel. "Types of the reference filter may differ" may refer to a filter coefficient of the reference filter, a number of filter taps, and filter intensity, or a number of filtering process may be differed.

In order to perform intra prediction, an intra-prediction mode of a current prediction unit may be predicted by an intra-prediction mode of a neighboring prediction unit that is adjacent to the current prediction unit. When the intra-prediction mode of the current prediction unit is predicted by using intra-prediction mode information of the neighboring prediction unit, and the both of the modes are identical, information that both of modes are identical may be transmitted by using a predetermined flag. Alternatively, when the modes are different, all prediction mode information within encoding/decoding target block may be encoded by entropy encoding.

Figure 7:
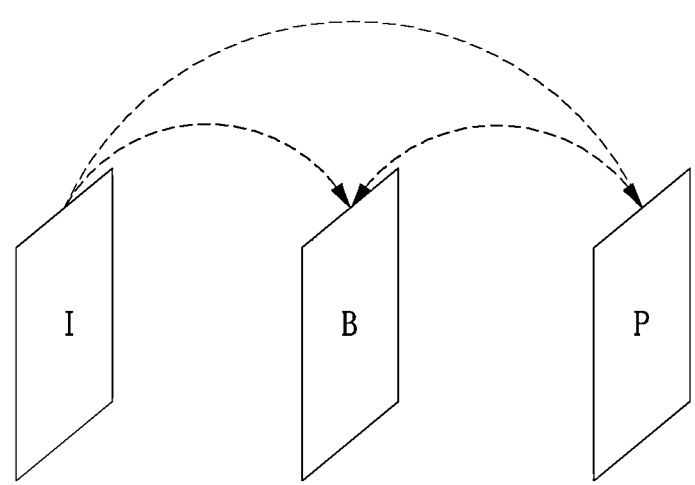
FIG. 7 is a diagram showing an example of inter-prediction process.

FIG. 7 is a diagram showing an example of an inter-prediction process.

A rectangle of FIG. 7 may refer to an image (or picture). In addition, arrows of FIG. 7 may indicate a prediction direction. In other words, the image may be encoded and/or decoded according to the arrow directions. Each image may be classified into an I-picture (Intra picture), a P-picture (Uni-predictive Picture), and a B-picture (Bi-predictive Picture), etc. according to an encoding type. Each picture may be encoded and decoded according to an encoding type of each picture.

When an encoding target image is an I-picture, the target image itself may be intra-encoded while inter prediction is performed. When an encoding target image is a P-picture, the target image may be encoded by inter prediction using a reference image in a forward direction, or motion compensation. When an encoding target image is a B-picture, the target image may be encoded by inter prediction using reference pictures in a forward direction and in a reverse direction, or motion compensation. Alternatively, the target image may be encoded by inter prediction using a reference image in forward direction or in a reverse direction. Herein, in case of the inter-prediction mode, the encoder may perform inter prediction or the motion compensation, and the decoder may perform motion compensation in response to the encoder. Images of a P-picture and B-picture that are encoded and/or decoded by using a reference image are used for inter prediction.

Hereinbelow, inter prediction according to an embodiment is described in detail.

Inter prediction or motion compensation may be performed by using a reference image and motion information. In addition, inter prediction may use the skip mode described above.

The reference picture may be at least one of a previous picture of a current picture or a subsequent picture of the current picture. Herein, in inter prediction, a block of the current picture based on the reference picture may be predicted. Herein, an area within the reference picture may be specified by using a reference picture index refIdx indicating the reference picture and a motion vector that will be described later.

In inter prediction, a reference block that corresponds to the current block within the reference picture may be selected. A prediction block of the current block may be generated by using the selected reference block. The current block may be a current encoding or decoding target block among blocks of the current picture.

Motion information may be derived from an inter-prediction process of the encoding apparatus 100 and the decoding apparatus 200. In addition, the derived motion information may be used for inter prediction. Herein, the encoding apparatus 100 and the decoding apparatus 200 may improve efficiency of encoding and/or decoding by using motion information of a reconstructed neighboring block and/or motion information of a collocated block (col block). The collocated block may be a block that spatially corresponds to an encoding/decoding target block within a reconstructed collocated picture (col picture). The reconstructed neighboring block may be a block within the current picture and a reconstructed block through encoding and/or decoding. In addition, the reconstructed block may be a block adjacent to the encoding/decoding target block and/or a block positioned at an outer corner of the encoding/decoding target block. Herein, the block positioned at the outer corner of the encoding/decoding target block may be a block that is adjacent in a vertical direction, and the block adjacent in a vertical direction is adjacent to the encoding/decoding target block in a horizontal direction. Alternatively, the block positioned at the outer corner of the encoding/decoding target block may be a block that is adjacent in a horizontal direction, and the block adjacent in a horizontal direction is adjacent to the encoding/decoding target block in a vertical direction.

Each of the encoding apparatus 100 and the decoding apparatus 200 may determine a predetermined relative position based on a block that is present at a position spatially corresponding to the current block within the collocated picture. The predetermined relative position may be positioned at an inside and/or outside of the block that is present at the position spatially corresponding to the current block. In addition, the encoding apparatus 100 and the decoding apparatus 200 may derive the collocated block based on the determined relative position. Herein, the collocated picture may be at least one picture among reference pictures included in a reference picture list.

A method of deriving the motion information may vary according to a prediction mode of the encoding/decoding target block. For example, the prediction mode applied for inter prediction may include an advanced motion vector predictor (AMVP) mode, a merge mode, and the like. Herein, the merge mode may refer to a motion merge mode.

For example, in the case of applying the advanced motion vector predictor (AMVP) mode, the encoding apparatus 100 and the decoding apparatus 200 may generate a prediction motion vector candidate list by using a motion vector of the restored neighboring block and/or a motion vector of the collocated block. In other words, the motion vector of the restored neighboring block and/or the motion vector of the collocated block may be used as a prediction motion vector candidate. Herein, the motion vector of the collocated block may refer to a temporal motion vector candidate, and the motion vector of the restored neighboring block may refer to a spatial motion vector candidate.

The encoding apparatus 100 may generate a bitstream, and the bitstream may include a motion vector candidate index. In other words, the encoding apparatus 100 may entropy encode the motion vector candidate index to generate the bit stream. The motion vector candidate index may indicate an optimal prediction motion vector selected among the prediction motion vector candidates included in the motion vector candidate list. The motion vector candidate index may be transmitted from the encoding apparatus 100 to the decoding apparatus 200 through the bitstream.

The decoding apparatus 200 may entropy decode the motion vector candidate index through the bit stream, and select the motion vector candidate of the decoding target block among the motion vector candidates included in the motion vector candidate list by using the entropy decoded motion vector candidate index.

The encoding apparatus 100 may calculate a motion vector difference (MVD) between the motion vector of the encoding target block and the motion vector candidate, and may entropy encode the motion vector difference (MVD). The bitstream may include the entropy encoded MVD. The MVD is transmitted to the decoding apparatus 200 through the bitstream. Herein, the decoding apparatus 200 may entropy decode the MVD from the bitstream. The decoding apparatus 200 may derive the motion vector of the decoding target block through a sum of the decoded MVD and the motion vector candidate.

The bitstream may include a reference picture index indicating the reference picture. The reference picture index may be entropy encoded and transmitted from the encoding apparatus 100 to the decoding apparatus 200 through the bitstream. The decoding apparatus 200 may predict the motion vector of the current block by using the motion information of the neighboring block, and may derive the motion vector of the decoding target block by using the predicted motion vector and a residual value of the predicted the motion vector. The decoding apparatus 200 may generate the prediction block of the decoding target block based on the derived motion vector and the reference picture index information.

As another method of deriving the motion information, a merge mode may be used. The merge mode may refer to a motion merging of a plurality of blocks. The merge mode may also refer to applying motion information of a single block to another block. When the merge mode is applied, the encoding apparatus 100 and the decoding apparatus 200 may generate a merge candidate list by using the motion information of the restored neighboring block and/or the motion information of the collocated block. Herein, the motion information may include at least one of 1) the motion vector, the reference picture index, and 3) an inter-prediction indicator. The prediction indicator may indicate a uni-direction (L0 prediction, L1 prediction), or a bi-direction.

Herein, the merge mode may be applied in a unit of a coding unit or a prediction unit (PU). In the case of performing the merge mode by the CU unit or the PU unit, the encoding apparatus 100 may generate a bitstream by entropy encoding predetermined information, and transmit the bitstream to the decoding apparatus 200. The bitstream may include the predetermined information. The predetermined information may include 1) a merge flag representing whether the merge mode is used for each block partition, 2) a merge index including information to which block among the neighboring blocks adjacent to encoding target block is merged. For example, neighboring blocks adjacent to encoding target block may include a left adjacent block of the current block, an upper adjacent block of the encoding target block, a temporally adjacent block of the encoding target block, and the like.

The merge candidate list may represent a list in which the motion information is stored. The merge candidate list may be generated before performing the merge mode. The motion information stored in the merge candidate list may be at least one of motion information of the neighboring block adjacent to the encoding/decoding target block, or motion information of the collocated block corresponding to the encoding/decoding target block in the reference picture, motion information newly generated by combining the motion information that is present in the merge motion candidate list in advance, and a zero merge candidate. Herein, the motion information of the neighboring block adjacent to the encoding/decoding target block may refer to a spatial merge candidate, and the motion information of the collocated block corresponding to the encoding/decoding target block in the reference picture may refer to a temporal merge candidate.

In the case of a skip mode, the skip mode applies the motion information of the neighboring block to the encoding/decoding target block. The skip mode may be one of other modes used in inter prediction. When the skip mode is used, the encoding apparatus 100 may generate a bitstream by entropy encoding information of the neighboring block that may be used for the encoding target block, and transmit the bit stream to the decoding apparatus 200. The encoding apparatus 100 may not transmit other information such as syntax information to the decoding apparatus 200. The syntax information may include at least one of residual information of the motion vector, an encoding block flag, and a transform coefficient level.

FIGS. 8 to 18 are diagrams showing a method of generating a geometric modified image by geometrically modifying an image.

A geometric modification of an image may refer to geometrically modifying light information of the image. The light information may refer to luminance, color, or chrominance of each point of the image. Alternatively, the light information may refer to a pixel value in a digital image. The geometric modification may refer to a parallel movement of each point within an image, a rotation of an image, a size change of an image, etc.

FIGS. 8 to 12 are diagrams respectively showing a geometric modification of an image according to the present invention. (x, y) of each figure refers to a point of an original image before the modification. (x', y') refers to a point that corresponds to the point (x, y) after the modification. Herein, the corresponding point refers to a point in which light information of the (x, y) is moved by the geometric modification.

Figure 8:
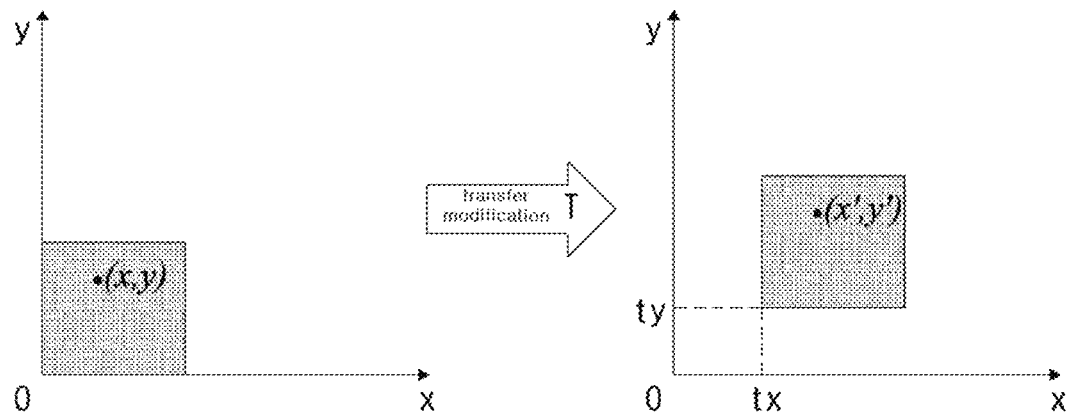
FIG. 8 is a diagram showing a transfer modification of an embodiment of a geometrical modification of an image according to the present invention.

FIG. 8 is a diagram showing a transfer modification of an embodiment of the geometric modification of the image according to the present invention.

In FIG. 8, tx refers to a displacement of each point that has transferred in an x-axis, and ty refers to a displacement of each point that has transferred in a y-axis. Therefore, a point (x', y') within the image is derived by adding tx and ty to a point (x, y) that is a point within the image before the modification. The transform modification may be represented in a matrix shown in FIG. 8.

Figure 9:
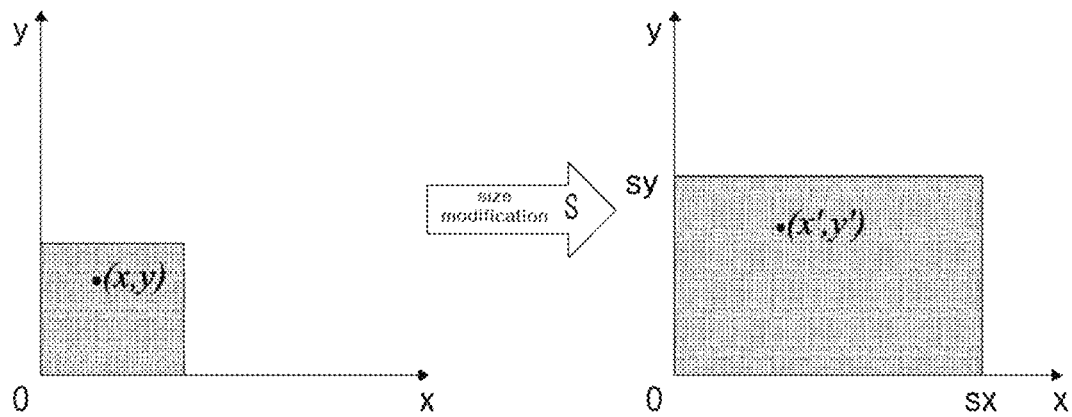
FIG. 9 is a diagram showing a size modification of an embodiment of a geometrical modification of an image according to the present invention.

FIG. 9 is a diagram showing a size modification of an embodiment of a geometrical modification of an image according to the present invention.

In FIG. 9, sx refers to a size modification multiple in a direction of an x-axis and sy refers to a size modification multiple in a direction of a y-axis. The size modification multiple may refer to a size ratio of an image before the modification to an image after the modification. When size modification multiple is equal to 1, it means that a size of the image before the modification is equal to a size of the image after the modification. When size modification multiple is larger than 1, it means that a size of the image is enlarged after the modification. When size modification multiple is smaller than 1, it means that a size of the image is reduced after the modification. The size modification multiple always has a value greater than 0. Therefore, a point (x', y') within the size-modified image after the modification is derived by multiplying sx and sy to a point (x, y) within the image before the modification. The size modification may be represented in a matrix shown in FIG. 9.

Figure 10:
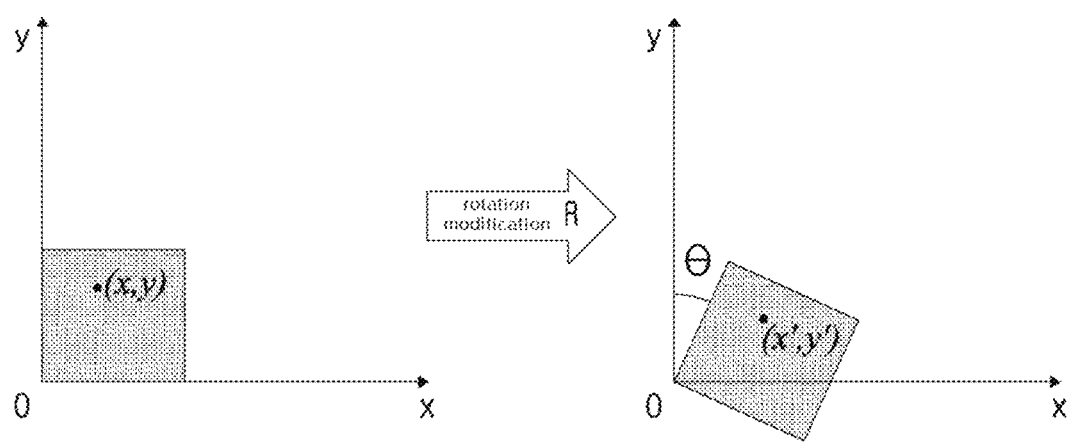
FIG. 10 is a diagram showing a rotation modification of an embodiment of a geometrical modification of an image according to the present invention

FIG. 10 is a diagram showing a rotation modification of an embodiment of a geometrical modification of an image according to the present invention In FIG. 10, θ refers to a rotation angle of an image. In the embodiment of FIG. 10, a rotation is performed centering around a point (0, 0) of an image before the modification. A point (x', y') within the rotation-modified image after the modification may be derived by using θ and a trigonometrical function. The rotation modification may be represented in a matrix shown in FIG. 10.

Figure 11:
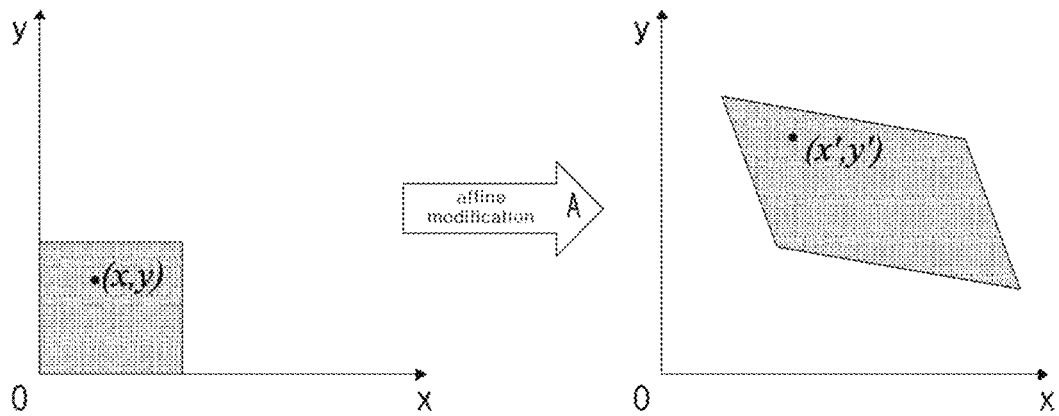
FIG. 11 is a diagram showing an affine modification of an embodiment of a geometrical modification of an image according to the present invention.

FIG. 11 is a diagram showing an affine modification of an embodiment of a geometrical modification of an image according to the present invention.

The affine modification refers to the case where a transfer modification, a size modification, and a rotation modification are complexly performed. A geometric modification of the affine modification may be varied according to orders of the transfer modification, the size modification, and/or the rotation modification that are applied to the image. The image may be modified in the form of tilting as well as the transfer modification, the size modification, and the rotation modification according to the order of applying among a plurality of the modifications composing the affine modification and complex of each of the modifications.

In FIG. 11, $M_i$ may be a 3×3 matrix for a transfer modification, a size modification, or a rotation modification. According to an order of modifications composing the affine modification, a 3×3 matrix may be obtained by matrix product each of matrixes for the modifications by each other. In FIG. 11, matrix A may correspond to a 3×3 matrix obtained by matrix product a matrix $M_1$ to matrix $M_n$. The matrix A may consist of elements a1 to a6. A matrix p is a point within an image before the modification that is represented in a matrix. A matrix p' is a point within an image after the modification and corresponds to the point p within the image before the modification. Therefore, the affine modification may be represented as a matrix equation p'=Ap.

Figure 12:
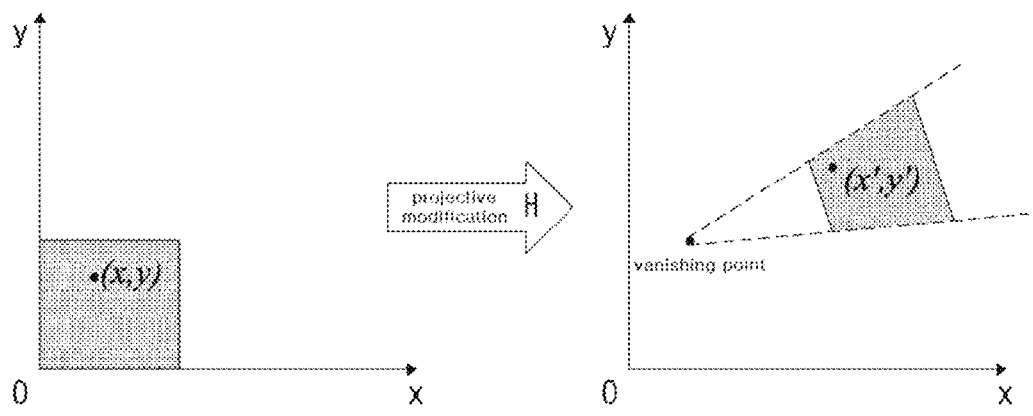
FIG. 12 is a diagram showing a projective modification of an embodiment of a geometrical modification of an image according to the present invention.

FIG. 12 is a diagram showing a projective modification of an embodiment of a geometrical modification of an image according to the present invention.

The projective modification may be an extended affine modification in which a perspective modification is added to the affine modification. When an object in a three-dimensional space is projected into a two-dimensional plane, a perspective modification may occur according to a viewing angle of a camera or an observer. In the perspective modification, objects far away are represented to be small and objects near are represented to be large.

In FIG. 12, a matrix H may be used for the projective modification. Elements h1 to h6 constituting the matrix H may correspond to the elements a1 to a6 constituting the matrix A for the affine modification of FIG. 11. Thereby, the projective modification may include the affine modification. Elements h7 and h8 constituting the matrix H may be elements related to the perspective modification.

A geometric modification of an image is a method for geometrically modifying the image to a specific form. A point within an image after a geometric modification that corresponds to a point within the image before the geometric modification may be calculated by a geometric modification defined in a matrix. On the contrary, a homography refers to a method of reversely deriving a mutial geometric modification matrix from two images respectively having points corresponding to each other.

Figure 13:
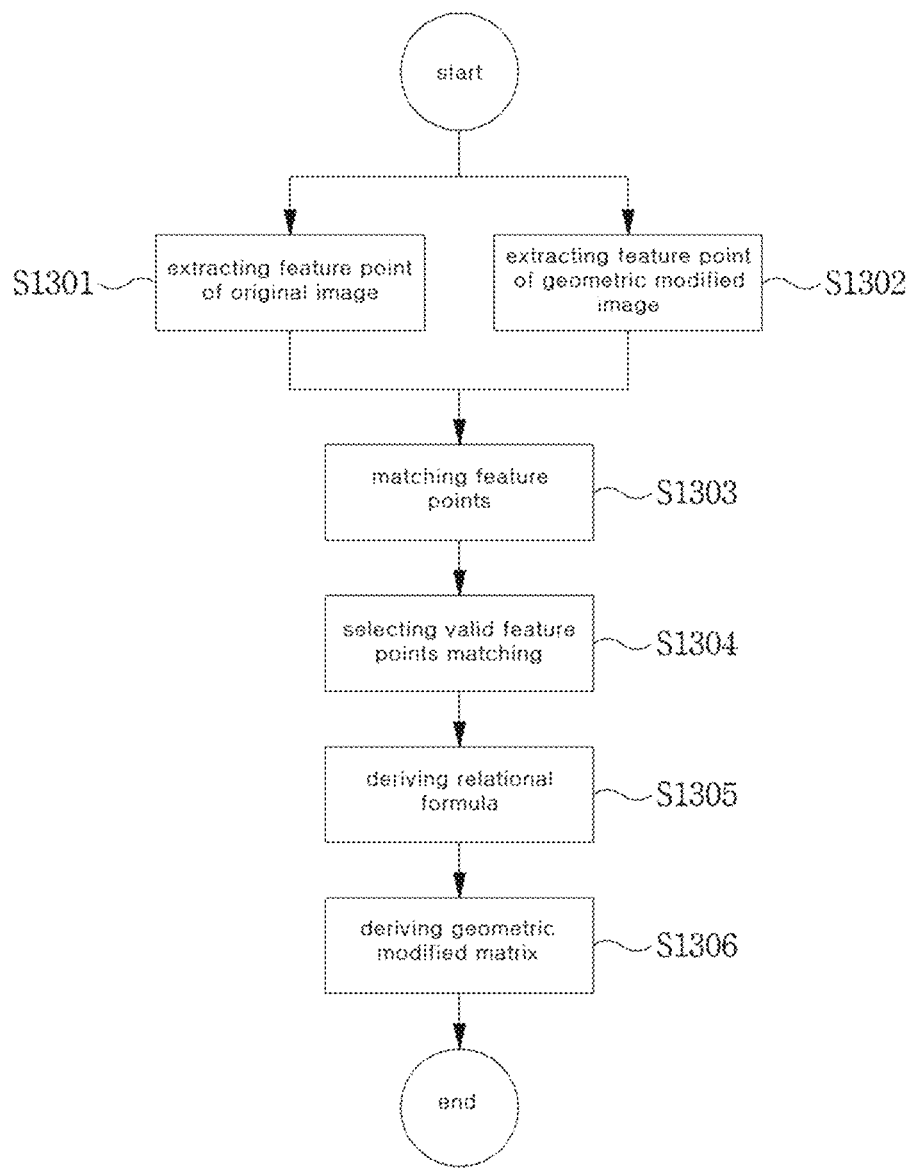
FIG. 13 is a diagram showing an example method of implementing a homography according to the present invention.

FIG. 13 is a diagram showing an example method of implementing a homography according to the present invention.

The homography may derive a geometric modification relation between two images based on an identification of two points within two images and correspond with each other. For this, a feature point matching may be used. A feature point of an image refers to a point that has a descriptive feature within the image.

In steps S1301 and S1302, the homography implementing method may extract feature points from an original image and a geometric modified image. A feature point of an image may be differently extracted according to an extracting method, or according to a usage purpose. A point within an image in which a luminance value thereof is dramatically changed, a center point of an area which has a specific shape, or a corner point of an object within the image may be used as the feature point. The feature point may be extracted by using algorithms such as scale-invariant feature transform (SIFT), speeded up robust feature (SURF), Blob Detection, etc.

In step S1303, the homography implementing method may match the feature point based on the feature points extracted from the original image and the geometric modified image. In detail, each of the extracted feature points are descriptive, the feature point between the two images may be matched by finding points having similar description information. The matched feature points may be used as a point in which the original image and the geometric modified image correspond with each other.

However, the feature point matching may not match points that actually correspond with each other. Therefore, in step S1304, a valid feature point among the derived feature points may be selected. The method of selecting the valid feature point may be varied according to a calculation algorithm. For example, methods such as a method of excluding a feature point that does not satisfy a baseline based on the description information, a method of excluding a feature point in which a coherency is very low through a distribution of matched results, or a method of using a random sample consensus (RANSAC) algorithm may be used. The homography implementing method may selectively perform the step S1304 according to a matching result of the feature points. In other words, the step S1304 may not be performed according to circumstances. Alternatively, the steps S1303 and S1304 may be merged. Alternatively, the homography implementing method may perform a matching process of a valid feature point instead of performing steps S1303 and S1304.

In step S1305, the homography implementing method may derive a relation formula between the original image and the geometric modified image by using the selected valid points. In step S1306, the homography implementing method may derive a geometric matrix by using the derived formula. Alternatively, the homography implementing method may not perform the step S1306, and output information of the derived formula obtained the step S1305 in a different form except for a geometric modification matrix.

FIG. 14 is an example method of deriving a relational formula between two points corresponding within two images according to the present invention.

A geometric modification of an image may be performed by a 3×3 matrix H. Therefore, simultaneous equations including elements h1 to h9 of the matrix H as unknown quantity may be derived from a matrix formula p'=Hp. Herein, p means a point within an original image, and p' means a point within a geometric modified image that corresponds to the point p. The equation may be simply calculated by fixing the h9 to 1 by dividing all elements of the matrix H into h9. Also, the number of unknown quantity may be reduced to 8 from 9.

Elements k1 to k8 of FIG. 14 correspond to values in which h1 to h8 is divided by h9. A geometric matrix in which h9 is changed in 1, and h1 to h8 are changed in k1 to k8, respectively, may perform an identical geometric modification. Therefore, 8 unknown values may be needed to be calculated. In FIG. 14, the final formula for one pair of points matching with each other in a single point may be expressed in two forms for x' and y'. At least 4 pairs of points matching with each other may be needed since there are 8 unknown values. However, the pair points may mismatch with each other as described above. Alternatively, the pair points may match with an error. Such an error may occur even when valid feature points are selected. Such an error may be reduced by using many pair points matching with each other while calculating the geometric modified matrix. Therefore, a number of the pair points that will be used may be determined considering such features.

FIG. 15 is a diagram showing a method of generating a geometrically modified image based on a geometric modification matrix and an original image according to the present invention.

As shown in FIG. 15, generation of a geometric modified image may correspond to a generation of light information of a corresponding point within the geometric modified image by using light information of a point within an original image. (x0, y0), (x1, y1), and (x2, y2) of FIG. 15 refer to different points within the original image. In addition, (x'0, y'0), (x'1, y'1), and (x'2, y'2) are points within the geometric modified image that respectively correspond to (x0, y0), (x1, y1), and (x2, y2). A function f calculates a corresponding x' coordinate of an x-axis within the geometric modified image by using the point (x, y) within the original image and additional information $\alpha$ that is used for the geometric modification. A function g calculates a corresponding y' coordinate of a y-axis within the geometric modified image by using the point (x, y) within the original image and additional information $\beta$ that is used for the geometric modification. When (x, y), (x', y'), function f, and function g are expressed in a matrix formula, a matrix H may refer to a geometric modification method. Therefore, points that mutually correspond to each other within the original image and the geometric modified image may be found by using the matrix H.

The geometric modification method of FIG. 15 may be problematic in a discrete sample image signal, since light information is only included in points having an integer number coordinate of the discrete image signal. Therefore, when a point within the geometric modified image and corresponding to a point within the original image has a real number coordinate, light information of the closest integer number coordinate is assigned to the point within the geometric modified image. Thus, light information may be overlapped to a part of points having a real number coordinate within the geometric modified image or the light information may not be assigned. In this case, inverse mapping may be used.

Figure 16:
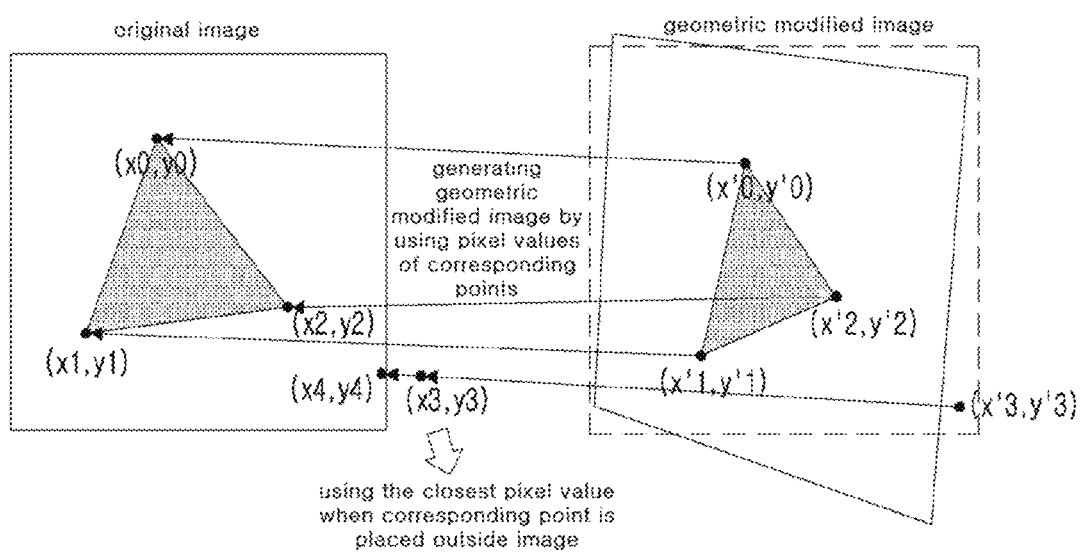
FIG. 16 is a diagram showing a method of generating a geometrically modified image by using inverse mapping according to the present invention.

FIG. 16 is a diagram showing a method of generating a geometrically modified image by using inverse mapping according to the present invention.

A dotted rectangular area of FIG. 16 refers to an area that is actually observed. Points within an original image corresponding to each point within the dotted rectangular area may be derived.

Therefore, light information of the original image may be assigned to all points within the geometric modified image. However, a point (x3, y3) corresponding to (x'3, y'3) may place outside of the original image. In this case, light information of the original image may not be assigned to the point (x'3, y'3). In points where light information of the original image is not assigned, neighboring light information of the original image may be assigned. In other words, light information of the closest point within the original image, for example, (x4, y4), may be assigned.

Figure 17:
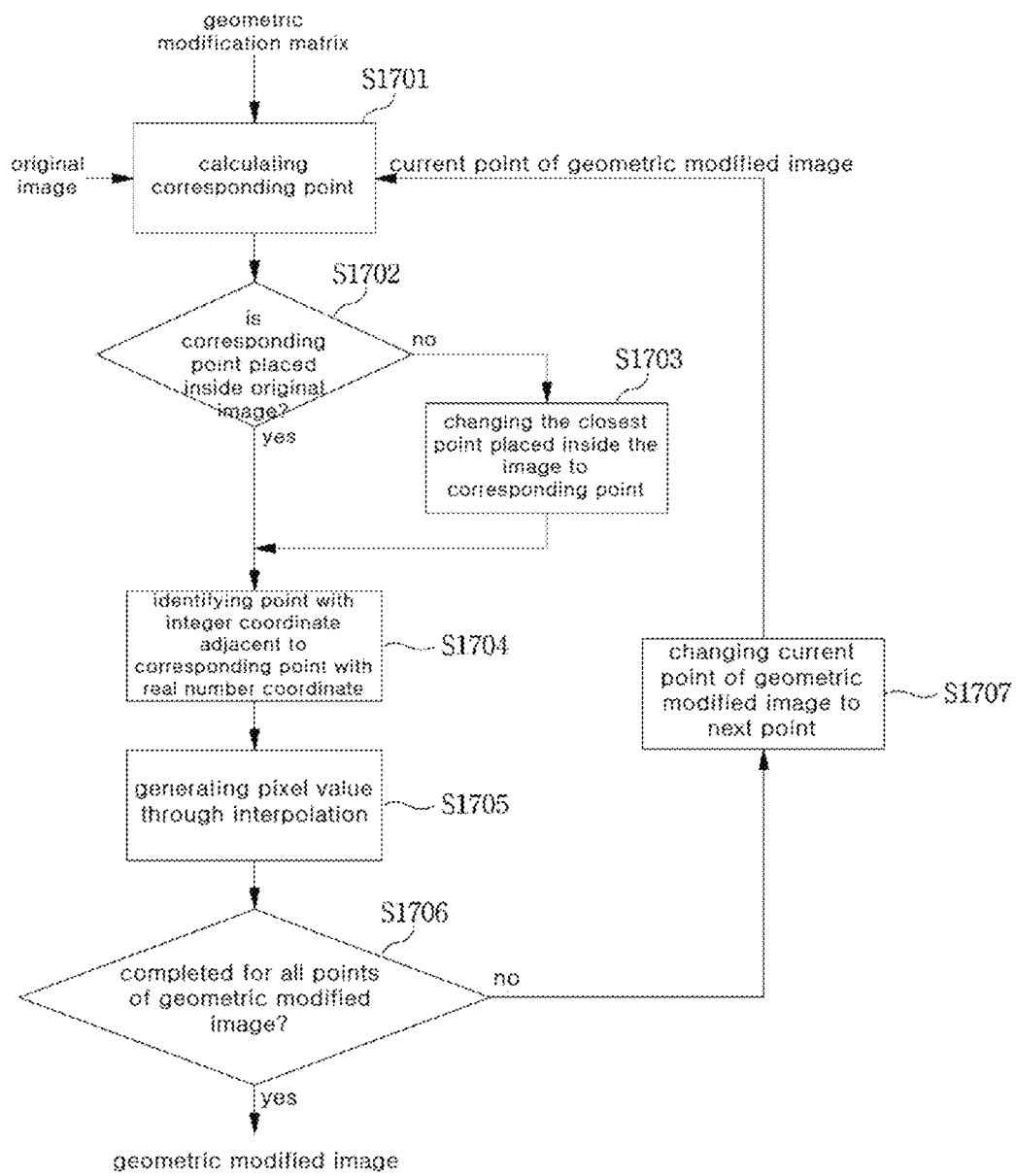
FIG. 17 is a diagram showing a method of generating a geometrically modified image based on a geometric modification matrix and an original image according to the present invention, wherein the geometric modification matrix may correspond to geometric modification information.

FIG. 17 is a diagram showing a method of generating a geometric modified image based on a geometric modification matrix and an original image according to the present invention wherein the geometric modification matrix may correspond to geometric modification information.

In step S1701, the generation method may receive input an original image, a geometric modification matrix and/or information on the current point of a geometric modified image. The generation method may calculate a point of the original image corresponding to the current point of the geometric modified image by using the original image and the geometric modified matrix. The calculated corresponding point of the original image may be a real number corresponding point having a real number coordinate.

In step S1702, the generation method may determine whether or not the calculated corresponding point is placed inside the original image.

In step S1702, when the calculated corresponding point is not placed inside the original image, in step S1703, the generation method may change the point closest to the calculated corresponding point within the original image with the corresponding point.

In step S1702, when the calculated corresponding point is placed inside the original image, the generation method may perform step S1704. The generation method may perform the step S1704 when the calculated corresponding point is changed in step 1703.

In step S1704, when the corresponding point has a real number coordinate, the generation method may identify a closest point having an integer number coordinate. When the corresponding point has an integer number coordinate, the generation method may skip steps S1704 and S1705, and perform step S1706.

In step S1705, the generation method may generate light information of the point having a real number coordinate by interpolating light information of the identified point having an integer number coordinate (for example, a pixel value). As methods of interpolating, Lanczos interpolation, S-Spline interpolation, Bicubic interpolation may be used.

In step S1706, the generation method may check all points within the geometric modified image whether or not the geometric modifications thereof are completed. Then, the generation method may finally output the generated geometric modified image.

When it is determined that the geometric modifications are not completed in step S170, in step S1707, the generation method may change a current point of the geometric modified image to another point, and may repeat steps S1701 to S1706.

Figure 18:
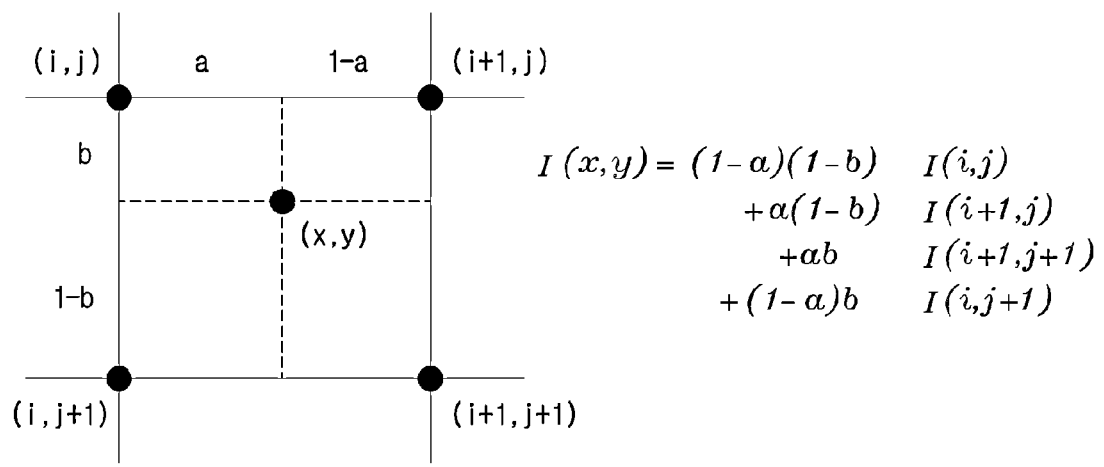
FIG. 18 is a diagram showing a bilinear interpolation among various interpolation methods explained with reference to FIG. 17 according to an embodiment the present invention.

FIG. 18 is a diagram showing a bilinear interpolation among various interpolation methods explained with reference to FIG. 17 according to an embodiment the present invention.

In FIG. 18, a real number coordinate (x, y) may correspond to the real number corresponding point mentioned in step S1704 of FIG. 17. 4 points (i,j), (i,j+1), (i+1,j), and (i+1,j+1) that are adjacent to the coordinate (x, y) may correspond to the closest point having an integer number coordinate that is mentioned in step S1704 of FIG. 17. I(x,y) may refer to light information of the point (x,y) such as luminance. a refers to an x-axis distance between i and x, and b refers to a y-axis distance between j and y. 1-a refers to an x-axis distance between i+1 and x, and 1-b refers to a y-axis distance between j+1 and y. Light information of the point (x, y) may be calculated from light information of points (i, j), (i, j+1), (i+1, j), and (i+1, j+1) by using a ratio of a to 1-a in the x-axis, and a ratio of b to 1-b in the y-axis.

When an inter-prediction unit of an encoder performs motion prediction, the inter-prediction unit may predict an encoding target area (a current area or a current block) within an encoding target picture (a current picture) by referencing a reference picture. Herein, when a time interval between the reference picture and the encoding target picture is great, or a rotation, a zoom-in, a zoon-out, or a global motion such as perspective change of an object has occurred between two images, then, pixel coherency between two images is lowered. Therefore, prediction accuracy may be lowered and encoding efficiency may be degraded. In this case, the encoder may calculate motion changes between the encoding target picture and the reference picture, and geometrically modify the reference picture such that the reference picture has similar form with the encoding target picture. The reference picture may be geometrically modified by referencing with reference to FIGS. 8 to 18. The reference picture may be geometrically modified in a unit of a frame, a slice, and/or a block. A picture that is generated by geometrically modifying the reference picture may be defined as a geometric modified picture. The motion prediction accuracy is improved by referencing the geometric modified picture rather than the reference picture. The entire or a part of the reference picture may be defined as a reference image, and a geometrically modified reference image may be defined as a geometrically modified image.

Motion information may be generated by performing inter prediction of the current block. The generated motion information may be encoded and included in a bitstream. The motion information may include a motion vector, a number of referencing image, a reference direction, etc. The motion information may be encoded in various forms of unit that configures the image. For example, the motion information may be encoded in a prediction unit (PU). In the present invention, the motion information may refer to inter-prediction information.

According to an embodiment of the present invention, an encoding/decoding target image may be predicted not only by using the reference image but also using the geometric modified image. When geometric modified image is used, geometric modification information may be additionally encoded/decoded. The geometric modification information may refer to all sorts of information for generating the geometric modified image based on the reference image or a part of the reference image. For example, the geometric modification information may include a global motion vector, a geometric transfer modification matrix, a geometric size modification matrix, a geometric affine modification matrix, and/or a geometric projection modification matrix.

The encoder may generate the geometric modification information based on a relation between the encoding target picture and the reference picture. The geometric modification information may be used for generating the geometric modified image such that the reference picture is geometrically modified to be similar to the encoding target picture. The encoder may perform optimized encoding by using both of the reference picture and the geometric modified image.

Figure 19:
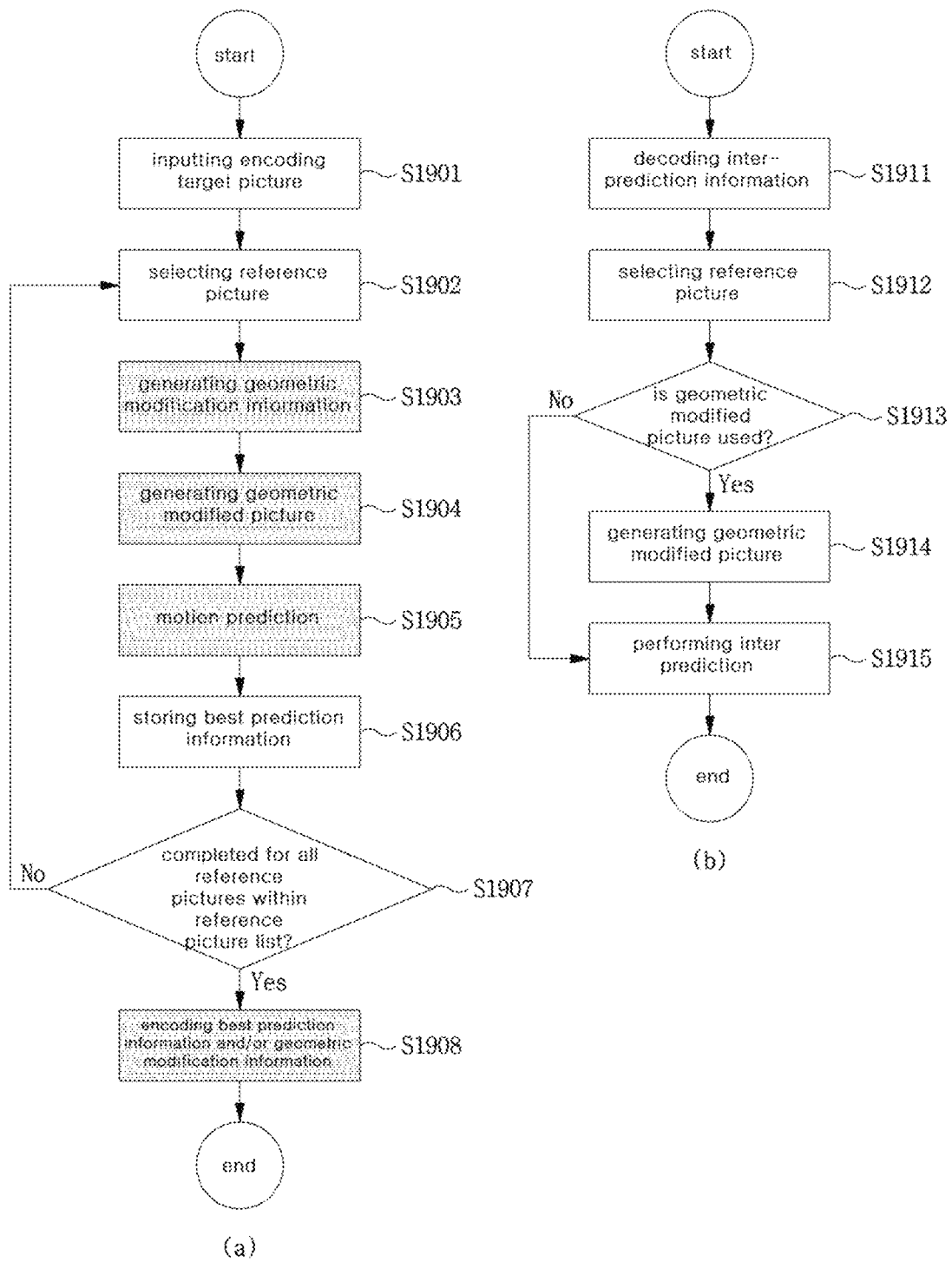
FIG. 19 is a diagram showing a motion prediction by using a reference picture and/or geometric modified picture according to an embodiment the present invention.

FIG. 19 is a diagram explaining a motion prediction by using a reference picture and/or geometric modified picture according to an embodiment the present invention.

FIG. 19(a) is a diagram of a motion prediction of an encoder according to an embodiment of the present invention. FIG. 19(b) is a diagram of a motion prediction of a decoder according to an embodiment of the present invention.

First, referring to FIG. 19(a), an example of the motion prediction of the encoder is described.

In steps S1901 and S1902, the encoder may specify an encoding target picture and a reference picture. The encoder may select the reference picture from a reference picture list. The reference picture list may be configured with reference pictures stored in a reference picture buffer (reconstructed picture buffer).

In step S1903, the encoder may generate geometric modification information based on the encoding target picture and the reference picture. The geometric modification information may be generated by using methods explained with reference to FIGS. 8 to 18.

In step S1904, the encoder may generate a geometric modified picture from a reference picture based on the generated geometric modification information. The encoder may store the generated geometric modified picture in a geometric modified picture buffer.

In step S1905, the encoder may perform a motion prediction by referencing the reference picture and/or the geometric modified picture.

In step S1906, the encoder may store or update optimal prediction information that has the best encoding efficiency based on a reference signal. As an indicator for determining the best encoding efficiency, a rate-distortion cost (RD Cost) may be used.

In step S1907, the encoder may determine whether for all of the reference pictures within the reference picture list, the above processes are applied. If not, the above steps may be repeated after moving the step S1902. If so, the encoder may encode finally determined optimal (or best) motion prediction information and/or geometric modification information in step S1908. The encoder may encode and transmit the geometric modification information only when the geometric modified picture is used for the motion prediction.

As a result of the motion prediction of FIG. 19(a), the encoder may generate a motion vector and information on reference picture as inter-prediction information. Information on the reference picture may include information for identifying the reference picture used for inter prediction among the reference pictures (for example, a reference picture index), and/or information indicating whether or not the geometric modified picture is referenced (for example, geometric modification usage information). Such information may be transmitted in various units. For example, the information may be transmitted in a unit of a picture, a slice, a coding unit (CU) or a prediction unit (PU).

Each step of FIG. 19(a) may be applied to a part of the encoding target picture and a part of the reference picture. Herein, the encoding target picture may correspond to an encoding target image, the reference picture may correspond to a reference image, and the geometric modified picture may corresponding to a geometric modified image.

Next, referring to FIG. 19(b), an example of the motion prediction of the decoder is described.

In step S1911, the decoder may receive and decode inter-prediction information of a current block.

In step S1912, the decoder may select a reference picture based on the inter-prediction information. For example, the decoder may use a reference picture index for selecting the reference picture.

In step S1913, the decoder may determine whether or not the geometric modified picture is used based on the inter-prediction information. The decoder may use geometric modification information for step S1913.

When the geometric modified picture is determined not to be used in step S1913, in step S1915, the decoder may perform inter prediction by referencing the reference picture selected in step S1912.

When the geometric modified picture is determined to be used in step S1913, in step S1914, the decoder may generate a geometric modified picture by geometrically modifying the reference picture selected in step S1912. The decoder may generate the geometric modified picture by geometrically modifying a part of the reference picture. In this case, the part of the reference picture may correspond to a reference image, and the geometric modified picture may correspond to a geometric modified image.

In step S1915, the decoder may perform inter prediction based on the geometric modified picture generated in step S1914.

Figure 20:
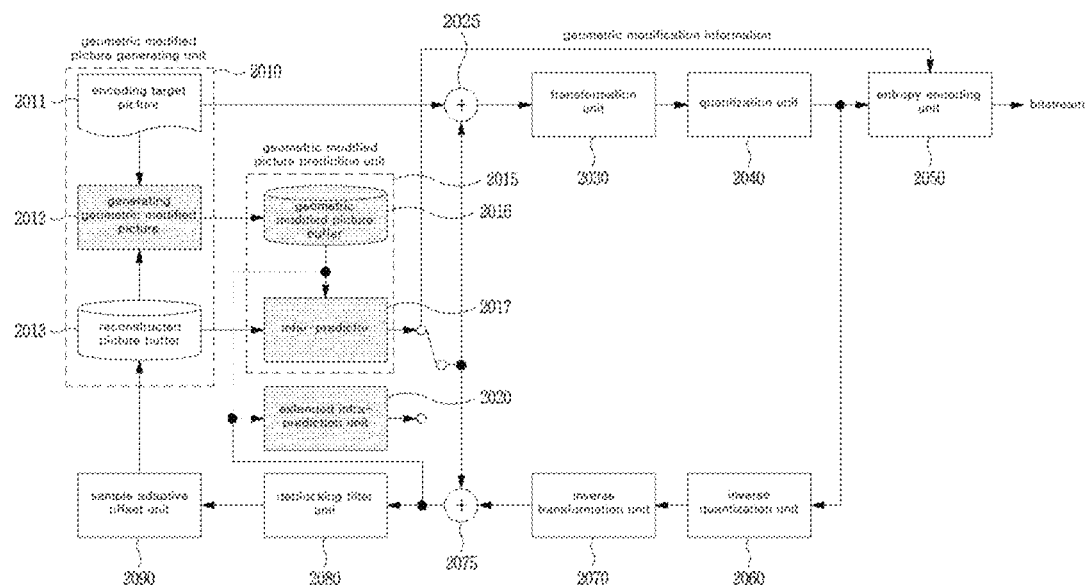
FIG. 20 is a block diagram showing a configuration of an image encoding apparatus to which another embodiment of the present invention is applied.

FIG. 20 is a block diagram showing a configuration of an image encoding apparatus to which another embodiment of the present invention is applied.

The encoding apparatus shown in FIG. 20 may include a geometric modified picture generating unit 2010, a geometric modified picture prediction unit 2015, an extended intra-prediction unit 2020, a subtractor 2025, a transformation unit 2030, a quantization unit 2040, an entropy encoding unit 2050, a inverse quantization unit 2060, an inverse transformation unit 2070, an adder 2075, a deblocking filter unit 2080, and a sample adaptive offset unit 2090.

The geometric modified picture generating unit 2010 may generate a geometric modified picture 2012 by calculating geometric modification information, the calculated geometric modification information reflects changes in pixel values between an encoding target picture 2011 and a reference picture of a reference picture list constructed from a reconstructed picture buffer 2013. The generated geometric modified picture 2012 may be stored in a geometric modified picture buffer 2016.

The geometric modified picture prediction unit 2015 may include the geometric modified picture buffer 2016 and an inter-predictor 2017. The geometric modified picture buffer 2016 may store the geometric modified picture generated in the geometric modified picture generating unit 2010. The inter-predictor 2017 may perform a motion prediction by using both the geometric modified picture stored in the geometric modified picture buffer and the reference pictures of the reference picture list constructed from the reconstructed picture buffer 2013 as reference signals. When the geometric modified picture is referenced while performing the motion prediction, geometric modification information that is used for generating the geometric modified picture may be transmitted to and encoded in the entropy encoding unit 2050.

The extended intra-prediction unit 2020 may perform extended intra prediction by referencing the geometric modified picture as well as already encoded/decoded signals of a current picture.

The configuration of the encoding apparatus explained with reference to FIG. 20 is only one of various embodiments of the present invention, and it is not limited thereto. Some of the configurations of the encoding apparatus shown in FIG. 20 may be merged or omitted with other configurations. Alternatively, additional configurations may be added. In addition, a part of the plurality of configurations included in the geometric modified picture generating unit 2010 and the geometric modified picture prediction unit 2015 may be independently configured from the geometric modified picture generating unit 2010 and the geometric modified picture prediction unit 2015. Alternatively, it may be included in a sub-configuration of another configuration or merged with another configuration.

Figure 21:
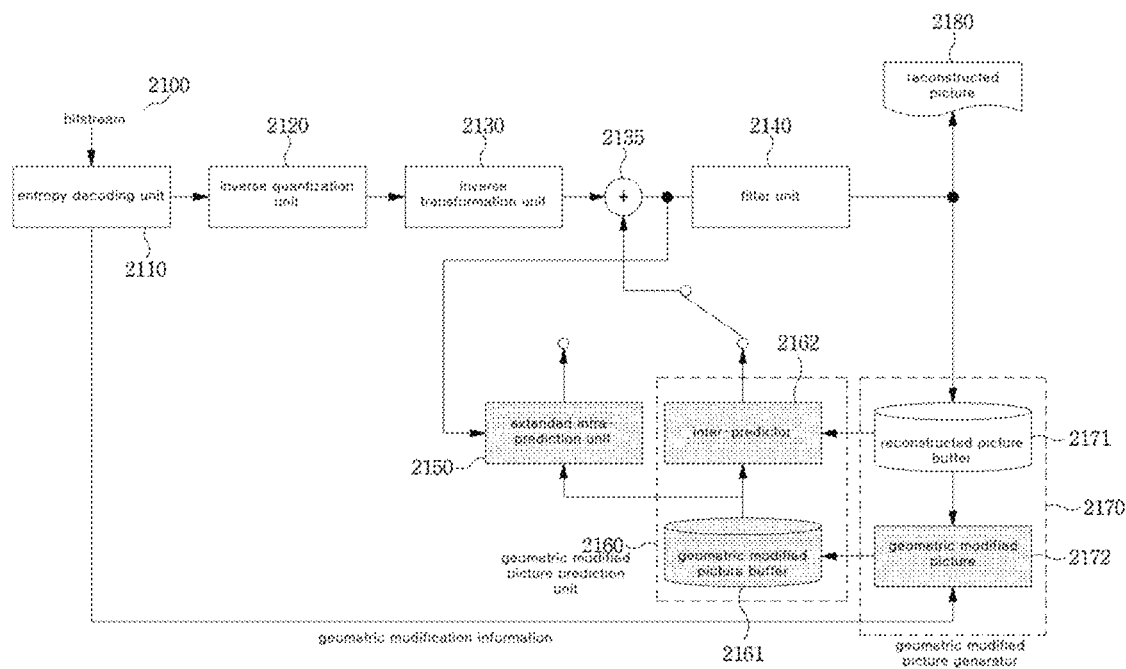
FIG. 21 is a block diagram showing a configuration of an image decoding apparatus to which another embodiment of the present invention is applied.

FIG. 21 is a block diagram showing a configuration of an image decoding apparatus to which another embodiment of the present invention is applied.

The decoding apparatus shown in FIG. 21 may include an entropy decoding unit 2110, a inverse quantization unit 2120, an inverse transformation unit 2130, a subtractor 2135, a filter unit 2140, an extended intra-prediction unit 2150, a geometric modified picture prediction unit 2160, and a geometric modified picture generator 2170. The decoding apparatus may output a decoded picture 2180 by receiving bitstreams 2100.

The geometric modified picture generator 2170 may generate a geometric modified picture 2172 by using geometric modification information that is extracted from the bitstream 2100 and entropy decoded and a reference picture of a reference picture list that is constructed from a reconstructed picture buffer 2171.

The geometric modified picture prediction unit 2160 may be configured with a geometric modified picture buffer 2161 for storing the geometric modified picture and an inter-predictor 2162.

The geometric modified picture 2172 generated in the geometric modified picture generator 2170 may be stored in the geometric modified picture buffer 2161. The geometric modified picture 2172 stored in the geometric modified picture buffer 2161 may be used as reference signals in the inter-predictor 2162.

The inter-predictor 2162 may reconstruct a decoding target picture by using the reference picture and/or the geometric modified picture as reference signals for a motion prediction based on the information transmitted from the encoding apparatus.

The configuration of the decoding apparatus explained with reference to FIG. 21 is only one of various embodiments of the present invention, and it is not limited thereto. Some of the configurations of the decoding apparatus shown in FIG. 21 may be merged or omitted with other configurations. Alternatively, additional configurations may be added. In addition, a part of the plurality of configurations included in the geometric modified picture generator 2170 and the geometric modified picture prediction unit 2160 may be independently configured from the geometric modified picture generator 2170 and the geometric modified picture prediction unit 2160. Alternatively, it may be included in a sub-configuration of another configuration or merged with another configuration.

According to the present invention, the geometric modification usage information may not be encoded and may be predicted. The geometric modification usage information may be information indicating whether or not the reference used in inter prediction is the geometric modified picture generated by geometric modification.

A video encoding/decoding apparatus using a geometric modified image needs information of identifying whether a reference image or a geometric modified reference image is used for inter prediction of a current block. In addition, when one or more reference images are used for inter prediction, all of reference images may be geometric modified reference images. Alternatively, a part of the reference images may be geometric modified reference images. Alternatively, none of reference images may be geometric modified reference images. Geometric modification usage information that indicates whether or not the reference image is used as it is, or the reference image is used by geometrically modifying thereof while performing inter prediction may be transmitted for each block unit. Therefore, a large amount of data may be used for encoding the geometric modification usage information. The block unit for transmitting the geometric modification usage information may include all types of units used for encoding an image. For example, the unit may be a macro block, a coding unit (CU), a prediction unit (PU), etc.

While encoding/decoding a current block, the present invention may predict geometric modification usage information of the current block based on geometric modification usage information derived from blocks that are temporally or spatially adjacent to the current block. Thus, an additional data transmission is omitted by predicting geometric modification usage information of the current block.

Figure 22:
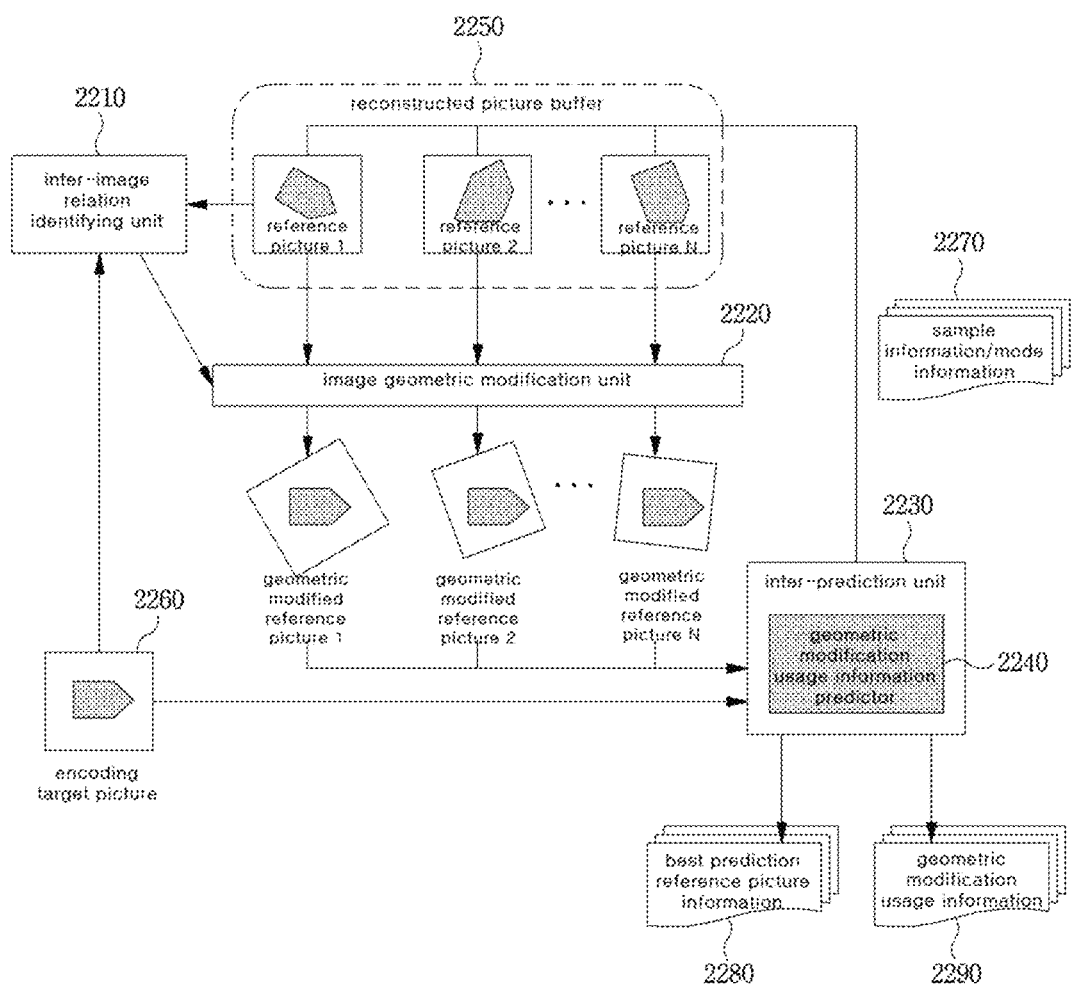
FIG. 22 is a diagram explaining an operation of an encoder including a prediction unit using geometric modification usage information according to an embodiment of the present invention.

FIG. 22 is a diagram explaining an operation of an encoder including a geometric modification usage information prediction unit according to an embodiment of the present invention.

The encoder according to the embodiment shown in FIG. 22 may include an inter-image relation identifying unit 2210, an image geometric modification unit 2220, an inter-prediction unit 2230, and/or a reconstructed picture buffer 2250.

The inter-image relation identifying unit 2210 may identify a relation between an encoding target picture 2260 and reference pictures stored in the reconstructed picture buffer 2250, and generate inter-image relation information. The inter-image relation information may refer to information that may be used for modifying the reference picture to be similar to the encoding target picture. In the present invention, the inter-image relation information may refer to geometric modification information. For example, the inter-image relation information may include a geometric modification matrix, and/or global motion information, etc.

The image geometric modification unit 2220 may generate a geometric modified reference picture from the reference picture based on the inter-image relation information generated in the inter-image relation identifying unit 2210. FIG. 15 may be an embodiment of generating a geometric modified reference picture. In the embodiment shown in FIG. 15, a matrix H may correspond to the inter-image relation information. Each pixel of the reference picture (original image in FIG. 15) may be matched to a position of the geometric modified reference picture (geometric modified image in FIG. 15).

The inter-prediction unit 2230 may determine a reference picture that has the best encoding efficiency by using each reference picture stored in the reconstructed picture buffer 2250 and/or each corresponding geometric modified reference pictures, and generate reference picture information 2280. The reference picture information 2280 may include all sorts of information that specifies the reference picture used for inter prediction by the encoder. For example, the reference picture information 2280 may include information specifying a reference picture within a reference picture buffer (i.e. a reference picture index), a motion vector indicating a reference block within a reference picture that is referenced by an encoding target block, etc. The inter-prediction unit 2230 may use pixel information (pixel value) of the reference pictures and/or the corresponding geometric modified reference pictures thereof, and mode information 2270. The mode information may refer to all sorts of information that is used for encoding/decoding each reference picture and/or the corresponding geometric modified reference picture. The mode information may include a partition structure and/or prediction information such as motion information, etc of the reference picture.

The inter-prediction unit 2230 may perform inter prediction for encoding the encoding target picture 2260 by using each reference picture and/or the corresponding geometric modified reference picture. The inter-prediction unit 2230 may not use all of the reference pictures, but use a part of the reference pictures that produce good results.

In order to decode an image, a decoder may need information indicating which reference picture is used among reference pictures and/or corresponding geometric modified reference pictures by the encoder. For example, the decoder may need the optimal (best) prediction reference picture information (e.g. number or index of the optimal prediction reference picture) 2280 and/or geometric modification usage information 2290 that indicates whether or not the geometric modified reference picture is used for inter prediction.

A geometric modification usage information predictor 2240 may predict the geometric modification usage information 2290 and encode the geometric modification usage information 2290 according to the prediction result. In the present invention, the geometric modification usage information predictor 2240 may be included in the inter-prediction unit 2230 and predict the geometric modification usage information 2290.

Operations performed in the encoder may be identically performed in the decoder to exactly reconstruct the information. Therefore, when the geometric modification usage information used in the encoder is identically predicted in the decoder, the geometric modification usage information may be predicted without additional data transmission.

Figure 23:
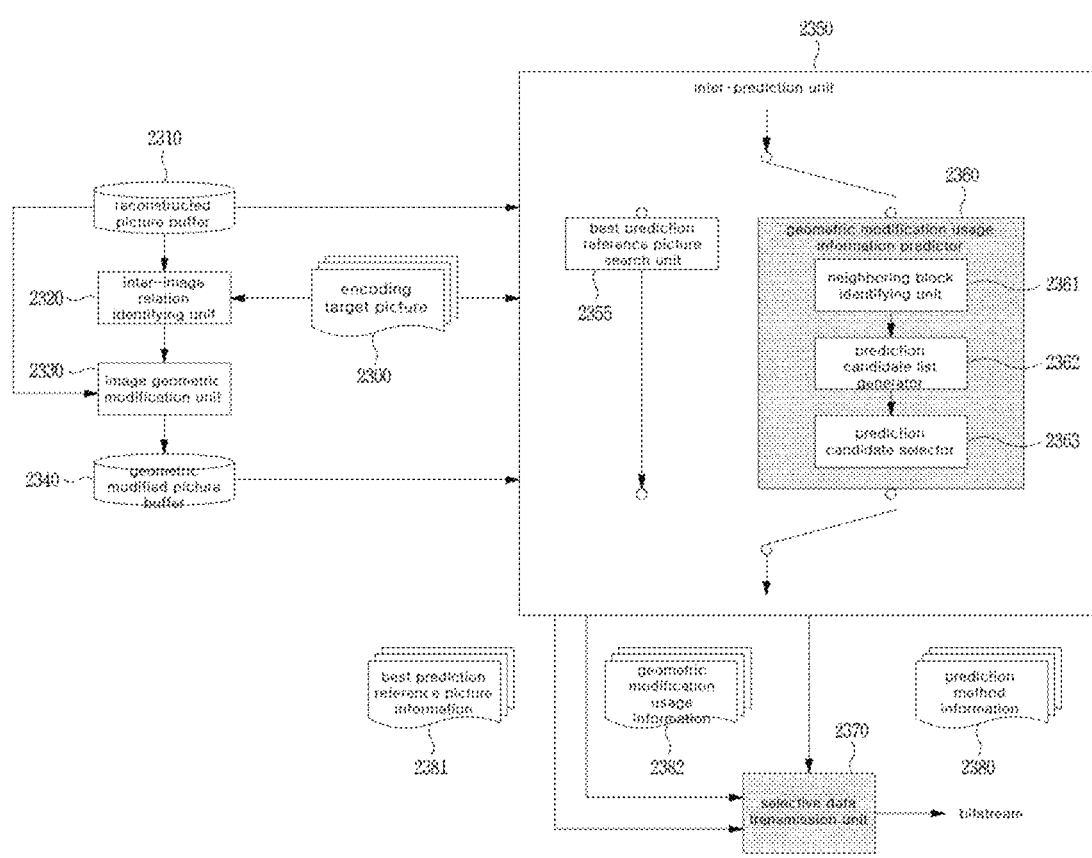
FIG. 23 is a diagram explaining an operation of an encoder that includes a geometric modification usage information predictor according to an embodiment of the present invention.

FIG. 23 is a diagram explaining an operation of an encoder including a geometric modification usage information prediction unit (predictor) according to an embodiment of the present invention.

The decoder according to the embodiment shown in FIG. 23 may include a reconstructed picture buffer 2310, an inter-image relation identifying unit 2320, an image geometric modification unit 2330, a geometric modified picture buffer 2340, an inter-prediction unit 2350, and/or a selective data transmission unit 2370.

The inter-image relation identifying unit 2320 may correspond to the inter-image relation identifying unit 2210 of FIG. 22. The inter-image relation identifying unit 2320 may identify a relation between an encoding target picture 2300 and each of the reference pictures and output the identified information as inter-image relation information. The inter-image relation information may be used in the image geometric modification unit 2330.

The image geometric modification unit 2330 may correspond to the image geometric modification unit 2220 of FIG. 22. The image geometric modification unit 2330 may generate a geometric modified reference picture (geometric modified picture) from each reference picture by using the inter-image relation information identified by the inter-image relation identifying unit 2320. The geometric modified reference picture buffer (geometric modified picture buffer) 2340 may manage the geometric modified reference pictures. The geometric modified reference picture buffer 2330 may be managed with the reconstructed picture buffer 2310. The geometric modified reference pictures generated by the image geometric modification unit 2330 may be used for inter prediction of the encoding target picture.

The inter-prediction unit 2350 may correspond to the inter-prediction unit 2230 of FIG. 22. The inter-prediction unit 2350 may perform inter prediction by using the reference pictures and/or the geometric modified reference pictures.

The inter-prediction unit 2350 may include a geometric modification usage information predictor 2360. Geometric modification usage information 2382 may indicate whether or not the reference picture used for inter prediction is the geometric modified reference picture generated by geometric modification. The geometric modification usage information predictor 2360 may predict information about whether to use a geometric modified reference picture for an encoding target block. Information about using the geometric modified reference picture may refer to all sorts of information that identifies a geometric modified reference picture among the all reference pictures used for inter prediction.

The geometric modification usage information predictor 2360 may include a neighboring block identifying unit 2361, a prediction candidate list generator 2362, and/or a prediction candidate selector 2363.

Neighboring blocks that are adjacent to the encoding target block (current block) may be used for predicting the geometric modification usage information 2382. Neighboring blocks may include blocks that are temporally and spatially adjacent to the current block. A temporally adjacent block may include a co-located block of FIG. 29 (M and/or H). A spatially adjacent block may include blocks A0 to B2 of FIG. 29. Alternatively, the spatially adjacent block may include blocks that are adjacent to the current block except for the blocks A0 to B2 of FIG. 29. Alternatively, the temporally adjacent block may include a block that is directly adjacent to the current block and a block that is spaced apart a predetermined distance from the current block.

A prediction similarity between the neighboring block and the current block may be used for predicting the geometric modification usage information 2382. Therefore, in order to predict the geometric modification usage information 2382, the neighboring block identifying unit 2361 may identify at least one neighboring block that is temporally and/or spatially adjacent to the current block. The neighboring block identifying unit 2361 may identify the neighboring block by checking whether or not the neighboring block is present, whether or not the neighboring block is available, and/or whether or not the neighboring block is an inter-prediction block, etc. The availability of the neighboring block may refer to whether or not information of the neighboring block is capable of being referenced. For example, when the neighboring block and the current block belong to different tiles and/or slices, or the neighboring block is not referenced by parallel processing or by other reasons, then the neighboring block may be determined to be not available.

The prediction candidate list generator 26362 may generate a prediction candidate list based on the availability of the neighboring block identified by the neighboring block identifier 2361 and/or superiority thereof when used for the prediction.

The prediction candidate selector 2363 may select one prediction candidate within the prediction candidate list. The prediction candidate selector 2363 may select the prediction candidate that has the best prediction result among the prediction candidates included in the prediction candidate list. When the prediction candidate that has the best prediction is selected, inter-prediction information of the current block may be predicted by using inter-prediction information of the selected prediction candidate. The inter-prediction information may include reference picture identification information, geometric modification usage information, and/or a motion vector. The geometric modification usage information predictor 2360 may be used in a merge mode and other inter-prediction modes. In addition, the geometric modification usage information predictor 2360 may be provided in plural based on the number of inter-prediction modes.

A best prediction reference picture search unit 2355 may be used when the prediction using the neighboring block temporally and/or spatially adjacent to the current block is not available, or when encoding efficiency is bad. The best prediction reference picture search unit 2355 may not predict the geometric modification usage information 2382 and directly search a reference picture that is capable of deriving the best prediction result of the current block. The best prediction reference picture search unit 2355 may generate best prediction reference picture information 2381 and the geometric modification usage information 2382 based on the searched reference picture.

The best prediction reference picture information 2381 may refer to information about a reference picture referenced while inter predicting, and may include a number (index) of the reference picture. The best prediction reference picture may refer to a reference picture that has the best encoding efficiency among the reference picture candidates when performing inter prediction.

The selective data transmission unit 2370 may select and encode information to be transmitted to the decoder among information generated by the inter-prediction unit based on prediction method used in the inter-prediction unit, and transmit the encoded information through a bitstream. Prediction method information 2380 may indicate a prediction method used in the inter-prediction unit, and may be encoded and transmitted through the bitstream. The prediction method may include prediction methods for performing inter prediction including a merge mode, and an AMVP mode.

When inter prediction of the current block is performed by predicting the geometric modification usage information, the geometric modification usage information may not be transmitted. The decoder may predict and obtain the geometric modification usage information by using the same method of the encoder. In this case, the selective data transmission unit does not need to encode the geometric modification usage information. Thus, an amount of data transmission to the decoder may be reduced.

Figure 24:
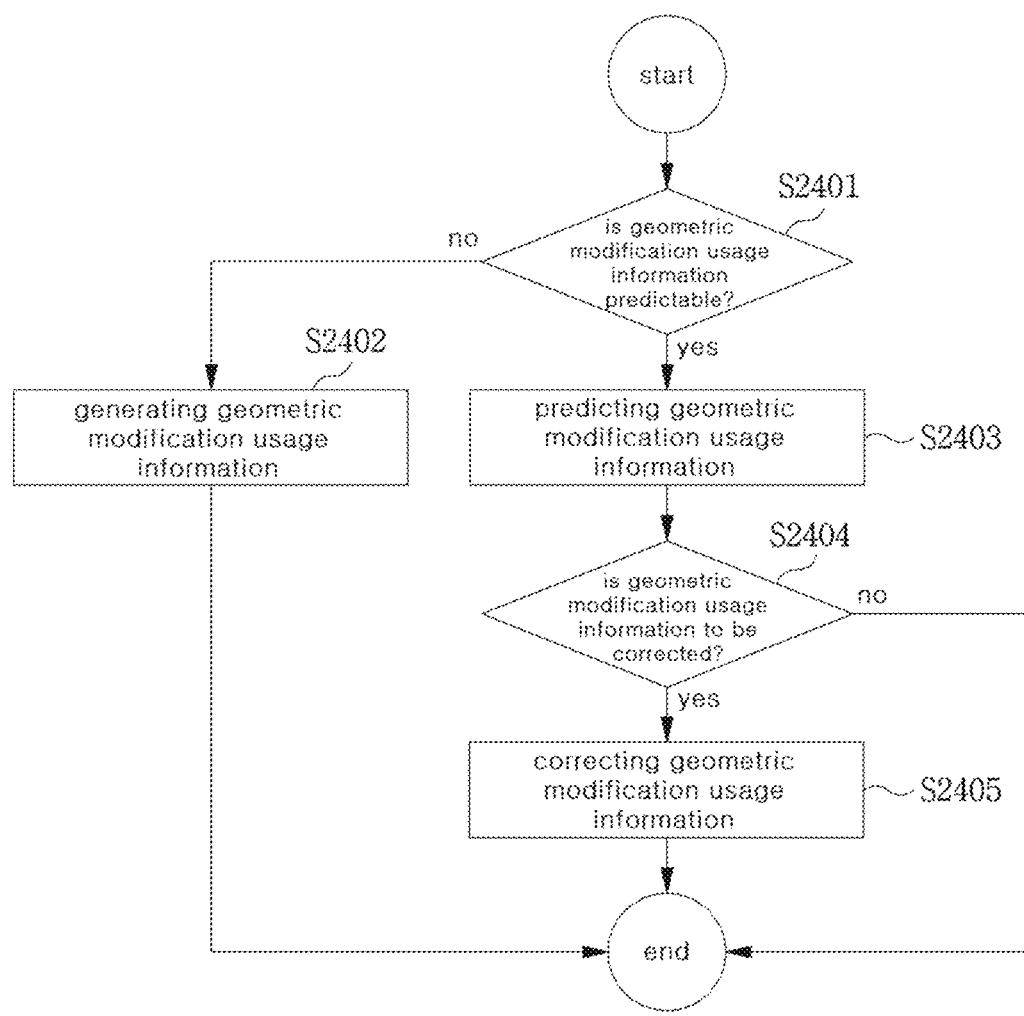
FIG. 24 is a diagram explaining a method of generating geometric modification usage information according to an embodiment of the present invention.

FIG. 24 is a diagram explaining a method of generating geometric modification usage information according to an embodiment of the present invention.

In step S2401, the generation method may determine a predictability of geometric modification usage information of an encoding target block (current block). The decision may be performed based on a presence and an availability of a neighboring block that is temporally and/or spatially adjacent to the encoding target block. For example, when all neighboring blocks are predicted by intra prediction, reference picture information of the neighboring block and/or the geometric modification usage information are not available, and thus the geometric modification usage information of the encoding target block may be determined to be not predictable.

When the generation method determines that the geometric modification usage information is not predictable in step S2401, in step S2402, the generation method may generate the geometric modification usage information. The generation of the geometric modification usage in step S2402 may be performed by directly searching a reference picture that is capable of deriving the best prediction result when inter predicting current block as the best prediction reference picture search unit 2355 of FIG. 23 does.

When the generation method determines that the geometric modification usage information is predictable in step S2401, in step S2403, the generation method may predict the geometric modification usage information. The generation method may predict the geometric modification usage information in step S2403 based on inter-prediction information of neighboring blocks that are adjacent to the current block as the geometric modification usage information predictor 2360 of FIG. 23 does.

In step S2404, the generation method may determine whether or not to correct the geometric modification usage information. The geometric modification usage information predicted in step S2403 may not actually match with the best geometric modification usage information. Such a mismatch may degrade encoding performance. The step S2404 may determine whether or not such mismatch is present.

The encoder may detect the performance degradation of the encoder caused by the predicted geometric modification usage information. For example, the encoder may induce the best geometric modification usage information that derives the best encoding performance by calculating a rate distortion cost (hereinafter, RD cost).

When the generation method determines that the geometric modification usage information is not to be corrected in step S2404, in other words, the predicted geometric modification usage information has good (or the best) performance, then the generation method may not transmit geometric modification usage information of the current block to the decoder. The decoder may predict the geometric modification usage information by using the same method used in the encoder. Therefore, the predicted geometric modification usage information may be also used as geometric modification usage information of the current block.

When the generation method determines that the geometric modification usage information is to be corrected in step S2404, in other words, the predicted geometric modification usage information differs from the best geometric modification usage information, the generation method may correct the predicted geometric modification usage information. For example, the generation method may generate the geometric modification usage information by using method of the step S2402 rather than using the predicted geometric modification usage information. Alternatively, the generation method may calculate a residual of the geometric modification usage information that is symbolized according an occurrence frequency, and may only encode residual information. Alternatively, the generation method may correct the predicted geometric modification usage information by using geometric modification usage information of the neighboring blocks that are temporally and/or spatially adjacent to the current block.

Figure 25:
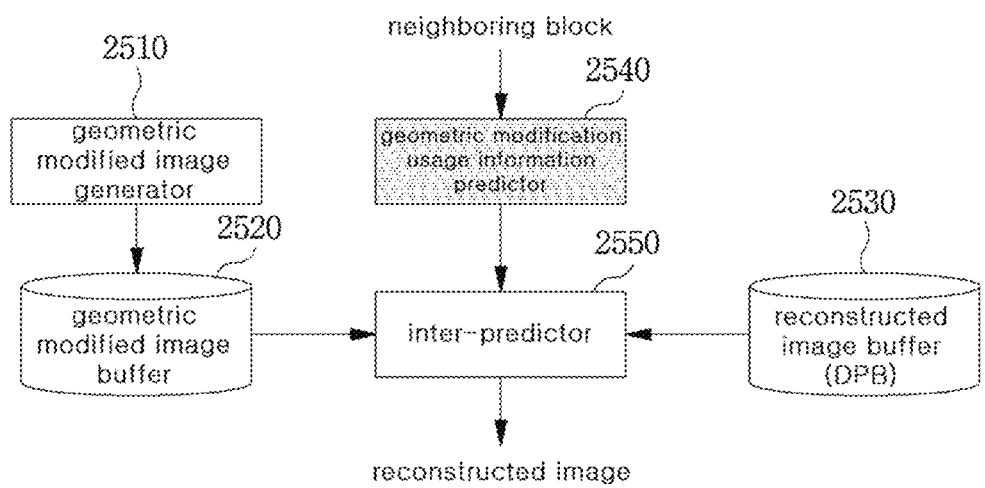
FIG. 25 is a configuration diagram of an inter-prediction unit including a geometric modification usage information prediction part according to an embodiment of the present invention.

FIG. 25 is a configuration diagram of an inter-prediction unit including a geometric modification usage information predictor according to an embodiment of the present invention.

The inter-prediction unit of FIG. 25 may include a geometric modified image generator 2510, a geometric modified image buffer 2520, a geometric modification usage information predictor 2540, a reconstructed image buffer 2530, and/or an inter-predictor 2550.

The geometric modified image generator 2510 may generate a geometric modified image based on a relation between an encoding/decoding target image (current image) and a reference image. The geometric modified image may be generated by using methods with reference to FIGS. 8 to 18. The geometric modification of the image may be performed to a part or the entire of the reference picture. In addition, the geometric modified image generator 2510 may generate an actual geometric modified image that is generated by geometrically modifying the reference image or a virtual geometric modified image that is generated based on the current image and the reference image. The virtual geometric modified image may refer to a geometric modified image including information capable of deriving light information of each pixel within the geometric modified image rather than light information (for example, brightness, color, and/or chroma) of each pixel within the geometric modified image. The generated the geometric modified image may be stored in the geometric modified image buffer 2520.

The geometric modification usage information predictor 2540 may predict geometric modification usage information of a current block within the current image. The prediction of the geometric modification usage information may be performed based on inter-prediction information (geometric modification usage information) of neighboring blocks adjacent to the current block. The prediction of the geometric modification usage information may be performed by using methods explained with reference to FIGS. 22 to 24. The predicted geometric modification usage information may be used for inter prediction of the current block by the inter-predictor 2550.

The inter-predictor 2550 may perform inter prediction of the current block by using at least one reconstructed image stored in the reconstructed image buffer 2530 and/or at least one geometric modified image stored in the geometric modified image buffer 2520. The inter-predictor 2550 may determine whether to reference the reconstructed image or the corresponding geometric modified image based on the geometric modification usage information.

In addition, multiple reference images may be referenced while performing inter prediction. Herein, reference image information may be in plural. For example, when inter prediction is bi-directional, two reference images may be referenced. Herein, reference image information of the two reference images may be transmitted to the decoder.

Figure 26:
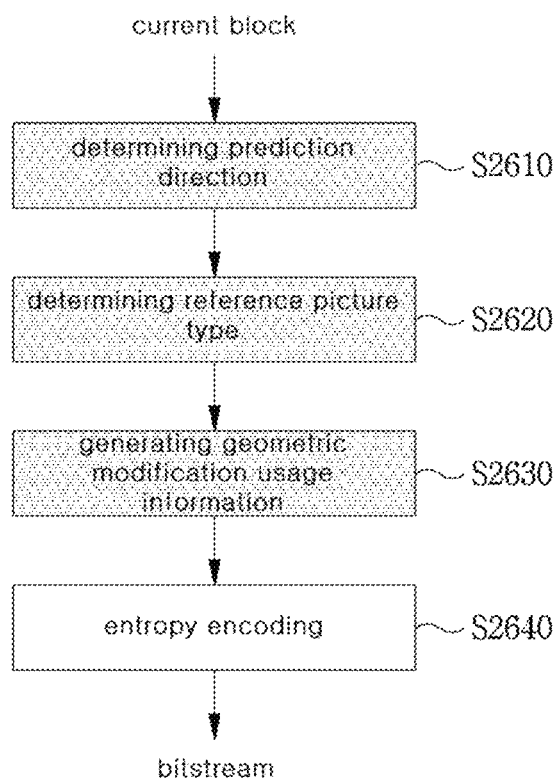
FIG. 26 is a diagram explaining an example encoding method of geometric modification usage information.

FIG. 26 is a diagram explaining an example encoding method of geometric modification usage information.

In order to accurately predict a current block, the encoding method may use at least one reference picture. In this case, direction information (prediction direction information) of the reference picture used in inter prediction, information for identifying the reference picture (reference picture identification information), and/or information about whether or not the reference picture is geometrically modified (geometric modification usage information) may be encoded. In step S2610, the encoding method may determine a prediction direction based on at least one reference picture used for inter prediction of the current block. As a result, a number of referenced pictures that are used for inter prediction may be checked in step S2610.

In step S2620, the encoding method may determine whether or not each of the referenced pictures used in inter prediction is geometrically modified. In other words, the encoding method may respectively determine whether or not all of the referenced pictures are geometrically modified reference pictures in step S2610. The result may be simplified by restricting a number of generating cases.

In step S2630, the encoding method may generate geometric modification usage information of the current block through steps S2610 and S2620. In step S2640, the encoding method may entropy encode the generated geometric modification usage information. Entropy encoding may refer to all types of encoding based on an occurrence frequency of a symbol. The prediction direction information and/or geometric modification usage information may be combined, and each of the combination may be expressed as a single symbol.

In addition, the generated symbol may be changed to a symbol having an advantageous occurrence frequency for the entropy encoding by using a residual between symbols based on a similarity between symbols. For example, when the generated symbols are 3, 4, 5, and 6, the generated symbols may be changed in 3, 1, 1, and 1 by generating residuals that are obtained by subtracting a previous symbol from a current symbol. The changed symbols may cause an improvement on entropy encoding efficiency since the entropy encoding is based on the occurrence frequency, and 1 is a high occurrence frequency.

Figure 27:
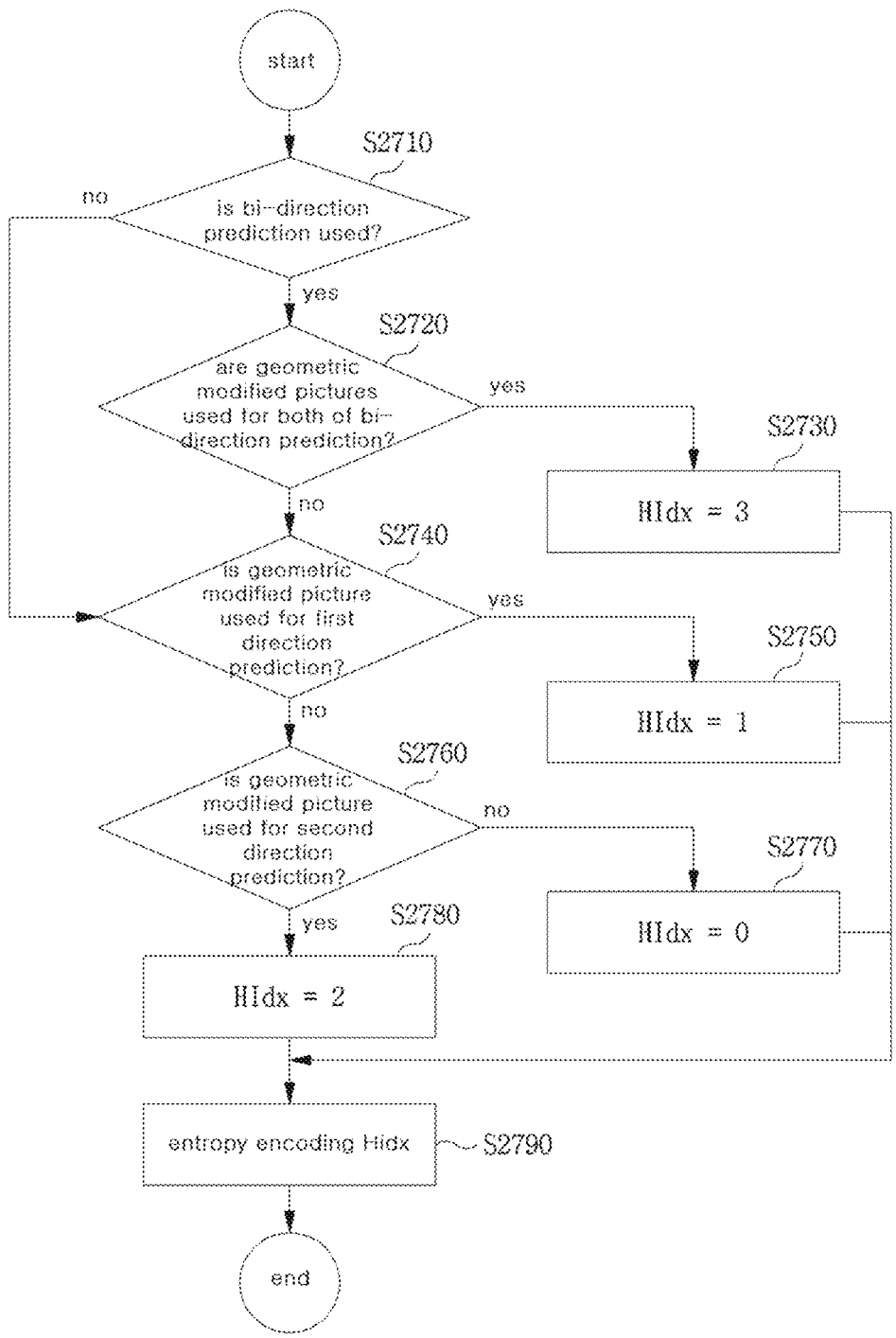
FIG. 27 is a diagram explaining another example encoding method of geometric modification usage information.

FIG. 27 is a diagram explaining another example encoding method of geometric modification usage information. As described with reference to FIG. 26, information that is encoded by inter prediction may include prediction direction information and/or information about whether or not each of the reference pictures is geometrically modified. The prediction direction information and/or information about whether or not each of the reference pictures is geometrically modified may be combined, and each of the combination may be encoded in a single symbol.

FIG. 27 shows an encoding example with two maximum prediction directions.

In FIG. 27, HIdx may be a symbol corresponding to a combination of prediction direction information and/or information about whether or not each of the reference pictures is a geometrically modified reference picture.

In step S2710, the encoding method may determine whether or not bi-direction prediction is used for inter prediction of an encoding target block. When the bi-direction prediction is not used, the encoding method may move to step S2740.

When the bi-direction prediction is used, in step S2720, the encoding method may determine whether or not geometric modified pictures are used for both directions of bi-direction prediction.

In step S2730, when the geometric modified pictures are used for both directions of bi-direction prediction in step S2720, the encoding method may determine the HIdx to be 3.

In step S2740, when the geometric modified picture are not used for both directions of bi-direction prediction in step S2720, the encoding method may determine whether or not the reference picture used for a first direction prediction is a reference picture that is geometrically modified. In step S2750, when the reference picture used for the first direction prediction is the geometric modified reference picture, the encoding method may determine the HIdx to be 1.

In step S2760, when the reference picture used for the first direction prediction is not the geometric modified reference picture, the encoding method may determine whether or not a reference picture used for a second direction prediction is a geometric modified reference picture. In step S2780, when the reference picture used for the second direction prediction is the geometric modified reference picture, the encoding method may determine the HIdx to be 2.

In step S2770, when the reference picture used for the second direction prediction is not the geometric modified reference picture in step S2760, the encoding method may determine the HIdx to be 0.

In step S2790, the encoding method may entropy encode the HIdx. The entropy encoding of the step S2790 may be performed based on accumulated occurrence frequency of the HIdx.

FIG. 27 is a diagram explaining the embodiment that determines and encodes the symbol (for example, HIdx) corresponding to the combination of the prediction direction information and/or the information about whether or not each of the reference pictures is geometrically modified. Orders of the methods shown in FIG. 27 may be changed. In addition, a value assigned to the HIdx is a value to distinguish the combination, and another value rather than the above-described value may be assigned to the HIdx.

According to the present invention, a merge mode may be used for efficiently encoding inter-prediction information. The merge mode uses motion information of neighboring blocks for motion information of a current block as it is and without any correction. Therefore, information used for correcting the motion information may not be additionally transmitted to the decoder.

FIGS. 28 to 34 are diagrams explaining examples of predicting geometric modification usage information by using a merge mode.

Figure 28:
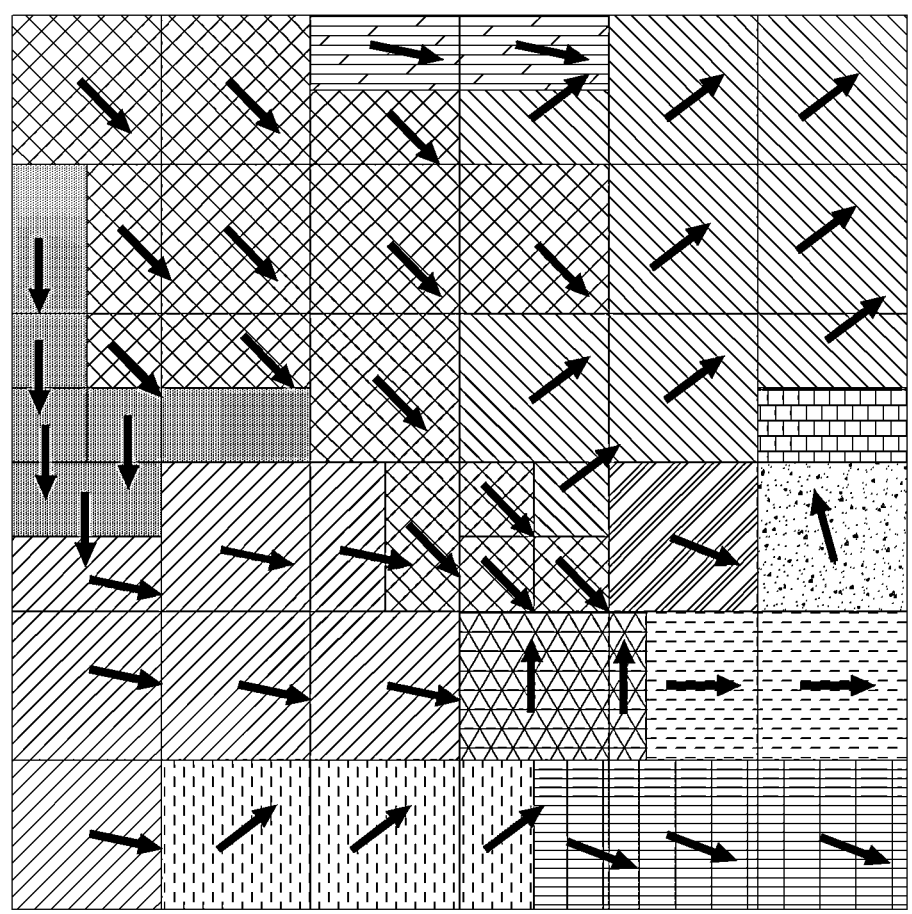
FIG. 28 is a diagram explaining an example of encoding an image by using a merge mode.

FIG. 28 is a diagram explaining an example of encoding an image by using a merge mode.

In FIG. 28, arrows refer to respective motion vectors of corresponding blocks. Blocks having similar motion vectors in FIG. 27 may be grouped together, and the grouped blocks may be represented by several different areas as shown in FIG. 28. The merge mode checks motion information of candidate blocks that are adjacent to a current block and merges the candidate blocks and the current block to a same group when the motion information of the candidate blocks are similar to the motion information of the current block. Therefore, motion information of a specific block may be used for another blocks that are adjacent to the specific block.

When the merge mode is used for the current block, merge information may be encoded rather than the motion information. The merge information may include a merge flag whether or not to perform the merge mode for each block partition, and information about selecting a merge candidate from a merge candidate list that includes at least one merge candidate adjacent to the current block. The at least one merge candidate will be described later with reference to FIG. 29. Motion information of the selected merge candidate may be sued as the motion information of the current block.

Figure 29:
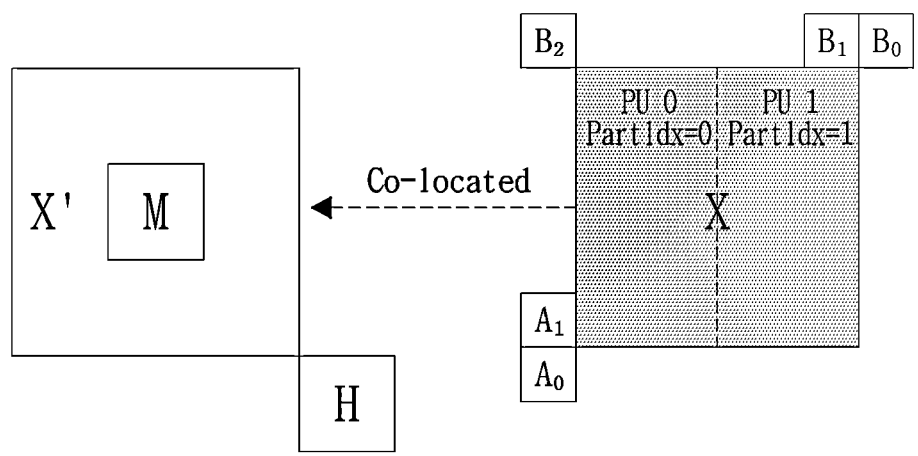
FIG. 29 is a diagram showing neighboring blocks included in a merge candidate list.

FIG. 29 is a diagram showing neighboring blocks included in a merge candidate list.

In FIG. 29, a current block X corresponding to a single CU is divided into two PUs. The merge candidate list of the two PUs may be configured based on the single CU that includes the two PUs. In other words, the merge candidate list may be configured by using neighboring blocks that are adjacent to the CU. For example, when motion information of a neighboring block A0 is available, the block A0 may be selected and inserted into the merge candidate list. The neighboring blocks may include A0, B1, B0, A0, and B2 as shown in FIG. 29 and/or a block H (or M) that is positioned at an identical position within a reference picture. The merge candidate list may include a predetermined number of candidates. The neighboring blocks may be included in the merge candidate list based on a predetermined order. The predetermined order may be A0→B1→B0→A0→B2→H (or M).

Herein, the block H (or M) refer to a candidate block for obtaining temporal motion information. The block H may refer to a block positioned at a lower right of a block X' within the reference picture, the block X' is positioned at a position corresponding to the same position as the current CU (X). The block M may refer to one of blocks that are inside the block X' within the reference picture. On a basis of the block X', the block H and the block M may be used for temporal candidates to configure the merge candidate list. When motion information of the block H is not available, then the block M may be used.

The merge candidate list may include a combined merge candidate generated based on a combination of merge candidates included in the merge candidate list.

Each of the merge candidates may include motion information. According to the present invention, each of the merge candidates may include not only the motion information but also information about whether or not a geometric modified reference picture (geometric modification usage information) is used, or may include a structure for obtaining the information.

FIGS. 30 to 33 are diagrams explaining methods of predicting geometric modification usage information according to an embodiment of the present invention.

An encoding apparatus according to the present invention may perform inter prediction by referencing at least one reference picture. In addition, the encoding apparatus may reference a geometric modified reference picture generated by geometrically modifying the reference picture to precisely perform inter prediction. Therefore, the encoding apparatus may need to determine whether the geometric modified reference picture is used while performing inter prediction of an encoding target block. As the information about whether or not the geometric modified reference picture is used, geometric modification usage information may be signaled. Alternatively, the geometric modification usage information may be predicted from neighboring blocks by using methods that will be described later.

Figure 30:
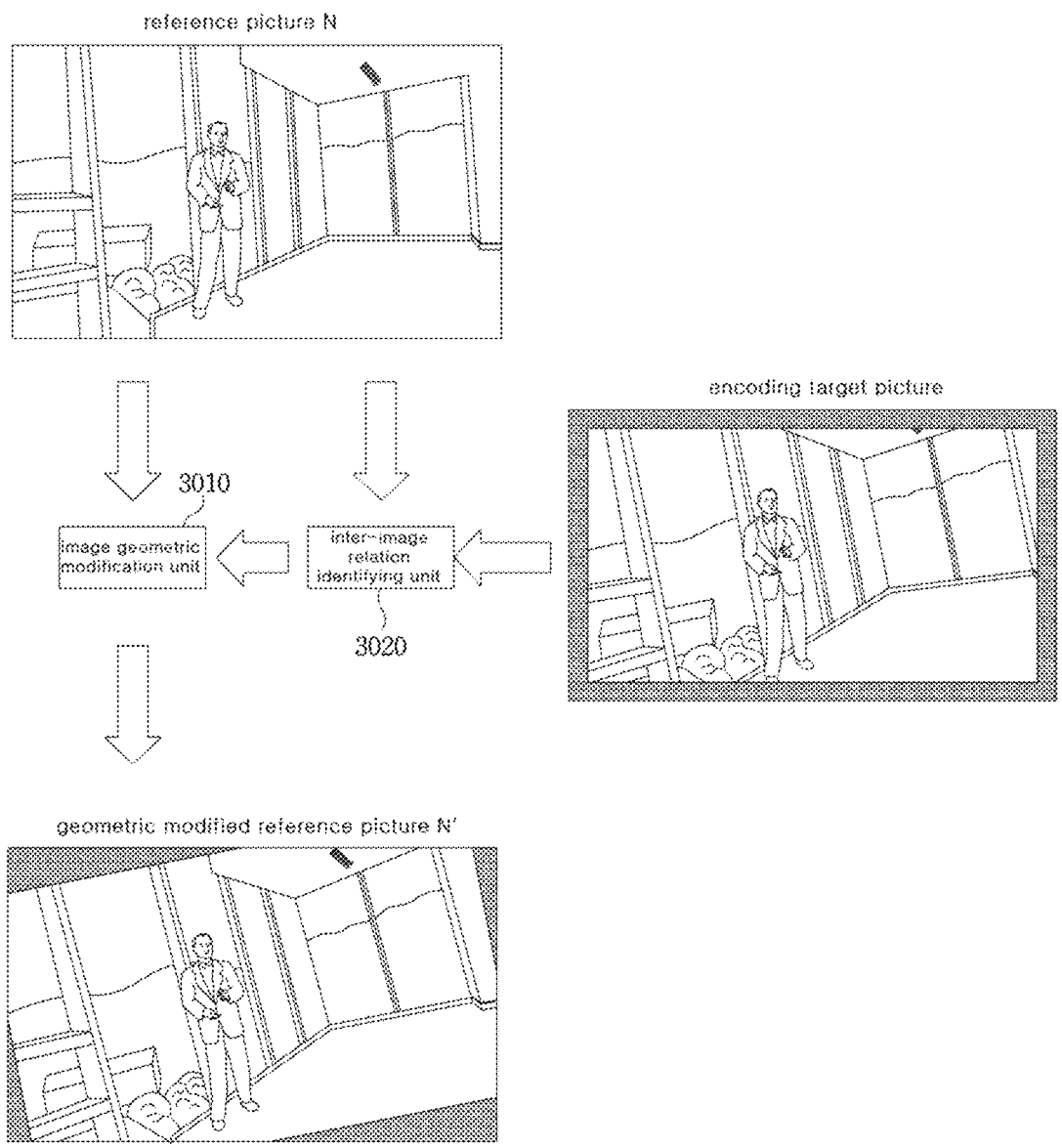
FIG. 30 is a diagram explaining steps of generating a geometric modified reference picture.

FIG. 30 is a diagram explaining steps of generating a geometric modified reference picture.

An inter-image relation identifier 3020 of FIG. 30 may correspond to the inter-image relation identifier 2210 of FIG. 22. The inter-image relation identifier 3020 may derive geometric modification information capable of geometrically modifying a reference image to be similar to an encoding target picture. The geometric modification information may be expressed as a geometric modification matrix or a relational formula between pixel positions.

An image geometric modification unit 3010 of FIG. 30 may correspond to the image geometric modification unit 2220 of FIG. 22. The image geometric modification unit 3010 may generate a geometric modified reference picture by geometrically modifying the reference picture by using the geometric modification information derived from the inter-image relation identifier 3020. A reference picture N refers to a reference picture with a number N, and a geometric modified reference picture N' refers to a geometric modified reference picture generated by geometrically modifying the reference picture N.

Figure 31:
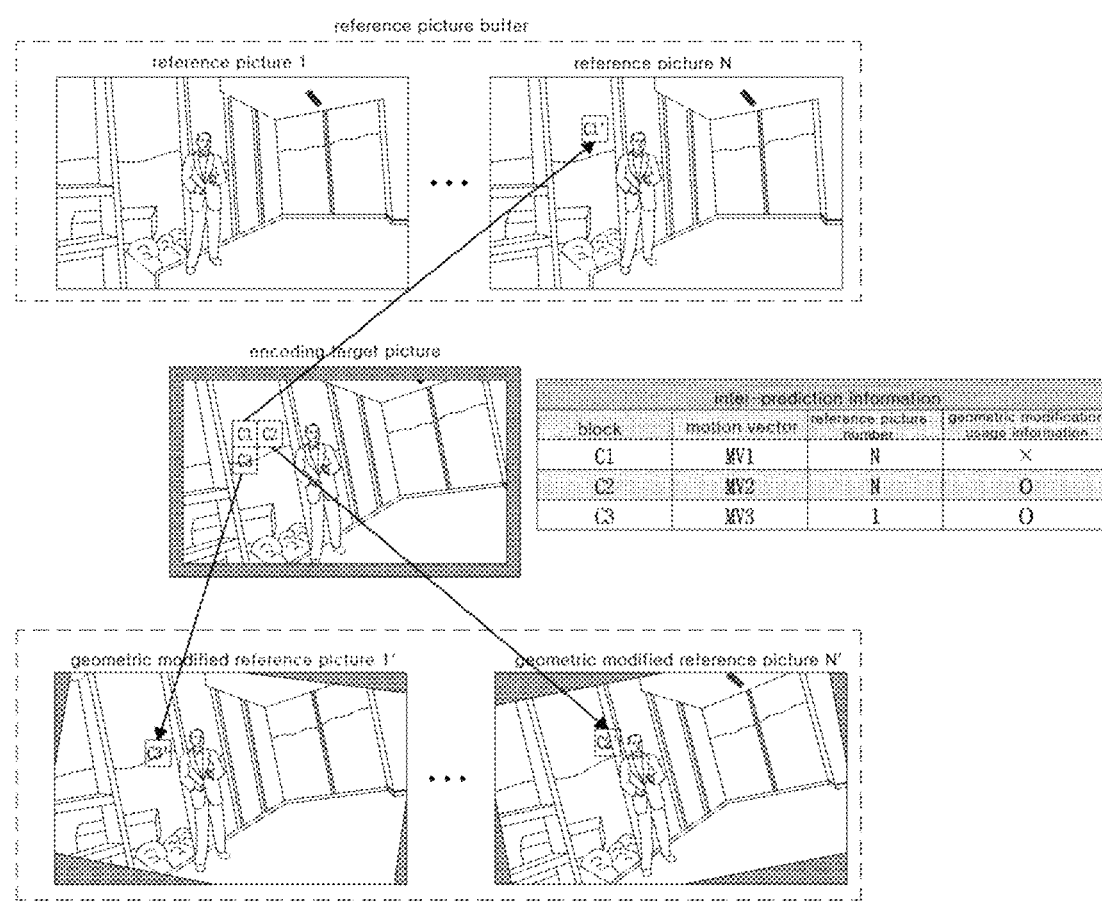
FIG. 31 is an example diagram showing a configuration of inter-prediction information included in a block within an encoding target picture.

FIG. 31 is an example diagram configuring inter-prediction information included in a block within an encoding target picture.

A reference picture buffer may include N reference pictures. A geometric modified reference picture buffer may include N geometric modified reference pictures respectively corresponding to the N reference pictures. The corresponding geometric modified reference pictures may be generated by geometrically modifying the reference pictures by using the method of FIG. 30. Therefore, the geometric modified reference picture buffer may have the same number of geometric modified reference pictures as the number of reference pictures of the reference picture buffer. C1, C2, and C3 are blocks that are already encoded/decoded blocks within an encoding target picture. Inter prediction of each of the blocks may be performed by referencing pictures from each other. C1', C2', and C3' refer to areas that are respectively referenced by C1, C2, and C3.

Inter-prediction information may include a motion vector and a reference picture number, and/or geometric modification usage information. The motion vector refers to a positional difference between positions of a current block and a reference block. MV1, MV2, and MV3 refer to motion vectors respectively indicating positional differences within a screen between C1 and C1', C2 and C2, and C3 and C3'. For example, when a position within a current picture of C1 is (10, 5) and a position within a reference picture N of C1' is (13, 7), then MV1 becomes (3, 2). A reference picture number refers to a number (or index) that specifies a reference picture within the reference picture buffer. In case of the geometric modified reference picture, the reference picture number refers to a number that specifies the reference picture used for generating the geometric modified reference picture. Geometric modification usage information indicates whether or not a position reference by a block is positioned within the geometric modified reference picture. The geometric modification usage information being O refers that the geometric modified reference picture is used. Alternatively, the geometric modification usage information being X refers that the geometric modified reference picture is not used.

An embodiment shown in FIG. 31 refers to a uni-direction prediction, and geometric modification usage information may be expressed as O/X. When two or more reference images are referenced while performing inter prediction, the geometric modification usage information may be used by defining symbol values corresponding to each of all possible combinations as described with reference to FIGS. 26 and 27.

The inter-prediction information configured in FIG. 31 may be used as a prediction candidate of inter-prediction information of a current block which will be described later.

Figure 32:
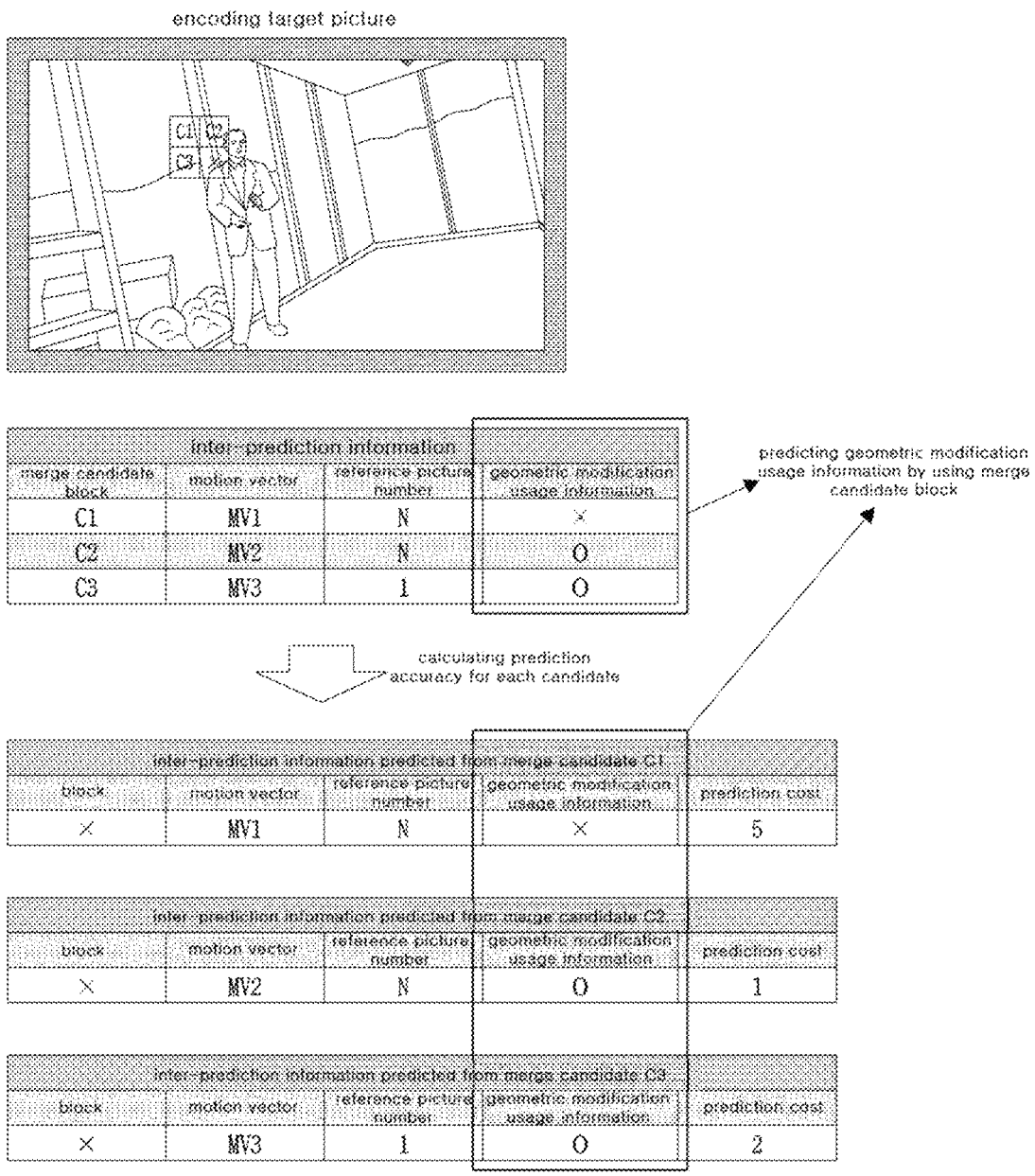
FIG. 32 is a diagram explaining an embodiment of predicting inter-prediction information of a current block X within a current picture.

FIG. 32 is a diagram explaining an embodiment of predicting inter-prediction information of a current block X within a current picture.

The inter-prediction information of the current block X that includes a motion vector, a reference picture number and/or geometric modification usage information may be predicted from inter-prediction information of neighboring blocks that are adjacent to the current block X. The neighboring blocks that are adjacent to the current block X may include temporal and/or spatial neighboring blocks that are described with reference to FIG. 29. In FIG. 32, blocks C1, C2, and C3 that are already encoded and spatially adjacent to the current block X are used as neighboring blocks. According a merge mode, the neighboring blocks C1, C2, and C3 may become merge candidates when the inter-prediction information of the current block X is predicted. 3 merge candidates are configured in FIG. 32, but it is not limited thereto.

According to the present invention, geometric modification usage information may be included in information that is derived by a merge mode prediction. Respective prediction costs for merge candidates C1, C2, and C3 of FIG. 32 may be calculated. The prediction cost may be calculated by a ratio of a prediction precision derived as a result of the prediction to an amount of bits generated while encoding. The prediction precision refers to similarity between pixel values of a predicted reference block within a reference picture and a current block within a current picture. The prediction cost being high means that large amount of bits are needed to reconstruct a block of the same quality. Generally, the higher the prediction precision is, the lower the prediction cost is.

FIG. 33 is a diagram explaining an embodiment of predicting inter-prediction information of a current block based on a merge candidate.

The embodiment of FIG. 33 predicts inter-prediction information of a current block X based on a block C2 that has the minimum prediction cost among merge candidates configured in FIG. 32. In detail, a motion vector, a reference picture number, and/or geometric modification usage information of the block C2 may be set as a motion vector, a reference picture number, and/or geometric modification usage information of the current block X. The inter-prediction information of the current block X may be predicted from the merge candidate block C2. An encoder and a decoder may generate the same merge candidate list when the merge mode is used. Therefore, the encoder just transmits information for selecting the merge candidate within the merge candidate list (for example, a merge index) rather than inter-prediction information of the current block X to the decoder.

In the embodiment of FIG. 33, a prediction block of the current block X and a prediction block of the merge candidate block C2 are adjacent within the same picture since the inter-prediction information of the current block X is derived from the merge candidate block C2.

Information about whether or not a geometric modified reference picture is used for neighboring blocks that are temporally and/or spatially adjacent to each other, and are identical or similar to each other. The present invention predicts the information about whether or not a geometric modified reference picture is used by using such features. According to the present invention, encoding efficiency is improved since the geometric modification usage information is not transmitted. For example, when prediction results of the encoder and the decoder are matched by using the same prediction methods, additional information transmission except for prediction information may be omitted.

FIG. 34 is a diagram explaining an embodiment method of predicting inter-prediction information of a current block based on a merge candidate list.

A merge candidate list of FIG. 34 may include 5 merge candidates. Descriptions of a motion vector, a reference picture number, and/or geometric modification usage information are the same as the description with reference to FIGS. 30 to 33. The method may use information of a merge candidate 1 as information of a current block since the merge candidate 1 has the best encoding performance among merge candidates.

An advanced motion vector prediction (AMVP) mode may be used for predicting a motion vector rather than the merge mode. Motion information may be also predicted by using neighboring blocks that are adjacent to a current block when using the AMVP mode. The motion information may be found by using the same method as the merge mode; however, a transmission of a residual value of the motion information, a prediction direction and/or reference picture index information may be further included in the AMVP mode. A prediction of geometric modification usage information according to the present invention may be also applied to the AMVP mode. For example, the AMVP mode may derive the geometric modification usage information of a current block by using geometric modification usage information of candidate blocks as the merge mode since the AMVP mode finds candidate blocks as the example of the merge mode. The geometric modification usage information of candidate block may be used as the geometric modification usage information of the current block as it is. Alternatively, a residual value between geometric modification usage information of the current block and the candidate block may be transmitted through a bitstream, and the geometric modification usage information of the current block may be derived from the geometric modification usage information of the candidate block and the residual value.

An inter-prediction unit of a decoder performing inter prediction by using two reference pictures needs to know information of the two reference pictures. The reference picture used for inter prediction may be a picture that is an already decoded picture stored in a reference picture buffer (reconstructed image buffer), or a geometric modified reference picture that is generated by geometrically modifying the already decoded picture. The reference picture buffer may manage the geometric modified reference picture by matching the already decoded picture and the corresponding geometric modified reference picture thereof.

Herein, information that is transmitted from an encoder to a decoder may include an identifier that may distinguish a reference picture within the reference picture buffer (matching the already decoded picture and corresponding geometric modified reference picture thereof) and an identifier (for example, geometric modification usage information) that may identify usage of a geometric modified reference picture.

A geometric modification usage information predictor of an embodiment of the present invention may predict geometric modification usage information of a current block based on modification usage information of neighboring blocks. In detail, the geometric modification usage information of the current block may be predicted by using statistics of geometric modification usage information of the neighboring blocks. The statistics may include an average value, a median value, a distribution, a maximum value, and/or a minimum value, etc. Alternatively, the geometric modification usage information of the current block may be predicted by using modification usage information of the neighboring block that is selected from the neighboring blocks. The predicted geometric modification usage information may be used for the geometric modification usage information of the current block as it is. Alternatively, the predicted geometric modification usage information may be corrected and then used for the geometric modification usage information of the current block. According to the present invention, a transmission of the geometric modification usage information of the current block may be omitted since the geometric modification usage information thereof is predicted by the geometric modification usage information of neighboring blocks.

In addition, geometric modification usage information may be encoded in a symbol with a small size by removing or reducing duplicated information by using coherency and statistic occurrence frequency of the predicted geometric modification usage information.

In addition, according to the present invention, a reference picture (reference image), or a geometric modified reference picture (a geometric modified image) that is generated by geometrically modifying the reference picture may be used for predicting an encoding/decoding target block. When a merge mode is used, a merge candidate block and an encoding/decoding target block may have similar motion information. Therefore, information identifying the usage of the geometric modified reference picture while predicting the encoding/decoding target block may be similar to the geometric modification usage information of the merge candidate block. According to the embodiment of the present invention, the geometric modification usage information and the motion information may be derived by using such features.

In addition, according to the embodiment of the present invention, information of an image may be expressed by using different symbols. Each of the symbols may have a biased occurrence frequency. Entropy coding refers to an encoding method in which an occurrence frequency of the symbol is considered. According to the entropy coding, a symbol having a high occurrence frequency is expressed in a symbol with a small size, and a symbol having a low occurrence frequency is expressed in a symbol with a large size, and thus encoding efficiency is improved. An encoder may calculate an occurrence frequency of each symbol. However, a decoder may not receive information about the occurrence frequency of each symbol. Therefore, the occurrence frequency of each symbol may be predicted based on the occurrence frequency of the symbol up to the point where the encoding/decoding has proceeded.

Tables 1 and 2 are views showing examples of syntax configurations of a coding unit (CU) and a prediction unit (PU) according to the present invention. In the tables 1 and 2, a cu_skip_flag being true refers that a merge skip mode is used. The merge skip mode refers to a merge mode wherein a transmission of additional information is still more omitted than the merge mode. Therefore, as like the merge mode, the merge skip mode may be applied to the present invention, and thus there is no need to additionally transmit geometric modification usage information.

A merge_flag indicates whether a merge mode is used or not. When the merge mode is used and applied to the present invention, there is no need to transmit geometric modification usage information. Alternatively, when the merge mode is not used, geometric modification usage information may be transmitted.

Examples of tables 1 and 2 are syntax configurations of the CU and the PU when the merge mode is applied to the present invention. When the merge mode is not used, a related syntax of geometric modification usage information may be included in the bitstream.

For example, a modification_image_reference_type indicates geometric modification usage information and is only transmitted when the merge mode is not used. In the examples of tables 1 and 2, the modification_image_reference_type is not included in the bitstream when the merge mode is used. Therefore, an amount of data transmission may be reduced by not signaling the geometric modification usage information when using the merge mode

TABLE 1

| | Descriptor |
|---|---|
| coding_unit(x0, y0, log2CbSize) | |
| ... | |
| if(cu_skip_flag[x0][y0]) | |
| prediction_unit(x0, y0, nCbS, nCbS) | |
| else{ | |
| ... | |
| if(!merge_flag[x0][y0]){ | |
| if(slice_type == B){ | |
| modification_image_reference_type | ae(v) |
| if(modification_image_reference_type == NONE_USE){ | |
| ref_0_modification_flag = false | |
| ref_1_modification_flag = false | |
| } | |
| if(modification_image_reference_type == REF_0_USE){ | |
| ref_0_modification_flag = true | |
| ref_1_modification_flag = false | |
| } | |
| if(modification_image_reference_type == REF_1_USE){ | |
| ref_0_modification_flag = false | |
| ref_1_modification_flag = true | |
| } | |
| if(modification_image_reference_type == BOTH_USE){ | |

TABLE 1-continued

| | Descriptor |
|---|---|
| ref_0_modification_flag = true | |
| ref_1_modification_flag = true | |
| } | |
| }else if(slice_type == P){ | |
| ref_0_modification_flag | u(1) |
| } | |
| } | |
| ... | |
| } | |

TABLE 2

| | Descriptor |
|---|---|
| prediction_unit(x0, y0, nPbW, nPbH) | |
| ... | |
| if(cu_skip_flag[x0][y0]) | |
| if(MaxNumMergeCand>1) | |
| merge_idx[x0][y0]) | ae(v |
| else{ | |
| ... | |
| if(!merge_flag[x0][y0]){ | |
| if(slice_type == B){ | |
| modification_image_reference_type | ae(v) |
| if(modification_image_reference_type == NONE_USE){ | |
| ref_0_modification_flag = false | |
| ref_1_modification_flag = false | |
| } | |
| if(modification_image_reference_type == REF_0_USE){ | |
| ref_0_modification_flag = true | |
| ref_1_modification_flag = false | |
| } | |
| if(modification_image_reference_type == REF_1_USE){ | |
| ref_0_modification_flag = false | |
| ref_1_modification_flag = true | |
| } | |
| if(modification_image_reference_type == BOTH_USE){ | |
| ref_0_modification_flag = true | |
| ref_1_modification_flag = true | |
| } | |
| }else if(slice_type == P){ | |
| ref_0_modification_flag | u(1) |
| } | |
| } | |
| ... | |
| } | |
| ... | |

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The computer-readable storage medium may include a program instruction, a data file, a data structure, and the like either alone or in combination thereof. The program instruction recorded in the computer-readable storage medium may be any program instruction particularly designed and structured for the present invention or known to those skilled in the field of computer software. Examples of the computer-readable storage medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. Examples of the program instruction include not only a mechanical language code formatted by a compiler but also a high level language code which may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used for encoding/decoding an image.

The invention claimed is:

1. A method for encoding an image, the method comprising:
  determining a prediction block of a current block within an encoding target picture by performing inter prediction based on a reference picture and geometric modification information;
  encoding geometric modification usage information of the current block indicating whether the geometric modification information is used for inter-prediction for the current block; and
  obtaining residual block of the current block by subtracting the prediction block from an original block,
  wherein:
  a part of the reference picture is geometrically modified based on the geometric modification information, a geometrical modification of the part of the reference picture including at least one of a size modification, and a rotation modification,
  the geometric modification information includes a plurality of geometric parameters,
  the prediction block of the current block is determined based on the geometrically modified part of the reference picture,
  the reference picture is selected from a reference picture list and is different from the encoding target picture, and the geometric modification information is encoded by using a motion information candidate list.

2. The method of claim 1, further comprising:
generating geometric modification information is obtained based on a relation between a pixel position in the encoding target picture and a pixel position in the reference picture corresponding to the pixel position in the encoding target picture.

3. The method of claim 1, wherein the prediction block is selected from either a first prediction block generated by referencing the reference picture that is not geometrically modified or a second prediction block generated by referencing the geometrically modified part of the reference picture.

4. The method of claim 3, wherein the selected prediction block is selected based on an encoding efficiency of the current block for each of the first prediction block and the second prediction block.

5. The method of claim 1, wherein the motion information candidate list includes a motion information candidate derived from a neighboring block adjacent to the current block.

6. The method of claim 1, wherein the geometric modification usage information is encoded in a symbol value corresponding to a combination of information on each prediction direction and geometric modification usage information on each prediction direction when a bi or more-directional prediction is used for generating the prediction block of the current block.

7. The method of claim 6, wherein encoding the symbol value is performed by encoding a difference value between the symbol value and a symbol value corresponding to geometric modification usage information that is previously used.

8. A method for decoding an image, the method comprising:
decoding geometric modification usage information of a current block indicating whether geometric modification information is used for inter-prediction for the current block;
when the geometric modification usage information indicates that the geometric modification information is used for inter prediction for the current block, determining a prediction block of the current block within a decoding target picture by performing inter prediction based on a reference picture and the geometric modification information; and
reconstructing the current block based on the prediction block and a residual block of the current block,
wherein:
a part of the reference picture is geometrically modified based on the geometric modification information, a geometrical modification of the part of the reference picture including at least one of a size modification, and a rotation modification,
the geometric modification information includes a plurality of geometric parameters,
the prediction block of the current block is determined based on the geometrically modified part of the reference picture,
the reference picture is selected from a reference picture list and is different from the decoding target picture, and
the geometric modification information is obtained by using a motion information candidate list.

9. The method of claim 8, wherein the motion information candidate list includes a motion information candidate derived from a neighboring block adjacent to the current block.

10. The method of claim 8, wherein the geometric modification usage information is decoded in a symbol value corresponding to a combination of information of each prediction direction and geometric modification usage information on each prediction direction when a bi or more-directional prediction is used for generating the prediction block of the current block.

11. The method of claim 10, wherein decoding the symbol value comprises:
decoding a difference value between the symbol value and a symbol value corresponding to geometric modification usage information that is previously used; and
adding the symbol value corresponding to geometric modification usage information that is previously used to the decoded difference value.

12. The method of claim 8, wherein the geometric modification information is the plurality of geometric parameters comprise at least one of a motion vector, geometric size modification parameters, geometric affine modification parameters, or a geometric projection modification parameters.

13. A non-transitory recording medium storing a bitstream that is generated by an encoding method, the encoding method comprising:
determining a prediction block of a current block within an encoding target picture by performing inter prediction based on a reference picture and geometric modification information;
encoding geometric modification usage information of the current block indicating whether the geometric modification information is used for inter-prediction for the current block; and
obtaining residual block of the current block by subtracting the prediction block from an original block,
wherein:
a part of the reference picture is geometrically modified based on the geometric modification information, a geometrical modification of the part of the reference picture including at least one of a size modification, and a rotation modification,
the geometric modification information includes a plurality of geometric parameters,
the prediction block of the current block is determined based on the geometrically modified part of the reference picture,
the reference picture is selected from a reference picture list and is different from the encoding target picture, and
the geometric modification information is encoded by using a motion information candidate list.

* * * * *